(12) United States Patent
Gamage et al.

(10) Patent No.: US 11,863,454 B2
(45) Date of Patent: *Jan. 2, 2024

(54) SYSTEMS AND METHODS FOR SCALABLE VALIDATION OF MULTIPLE PATHS IN A NETWORK USING SEGMENT ROUTING

(71) Applicant: Cisco Technology, Inc., San Jose, CA (US)

(72) Inventors: Amila Pradeep Kumara Tharaperiya Gamage, Kanata (CA); Michel Dean Taillon, Stittsville (CA); Darren Russell Dukes, Ottowa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,216

(22) Filed: Jul. 29, 2022

(65) Prior Publication Data
US 2022/0368638 A1    Nov. 17, 2022

Related U.S. Application Data

(63) Continuation of application No. 17/112,663, filed on Dec. 4, 2020, now Pat. No. 11,405,320.

(51) Int. Cl.
*H04L 47/17*    (2022.01)
*H04L 47/12*    (2022.01)
*H04L 47/33*    (2022.01)

(52) U.S. Cl.
CPC .............. *H04L 47/17* (2013.01); *H04L 47/12* (2013.01); *H04L 47/33* (2013.01)

(58) Field of Classification Search
CPC .......... H04L 47/17; H04L 47/12; H04L 47/33
See application file for complete search history.

(56) References Cited

U.S. PATENT DOCUMENTS

| 10,447,589 | B2 | 10/2019 | Bardhan et al. |
| 10,887,225 | B1 | 1/2021 | Chan et al. |
| 11,405,320 | B2 * | 8/2022 | Gamage .................. H04L 47/12 |

(Continued)

FOREIGN PATENT DOCUMENTS

| EP | 3349401 | 7/2018 |
| EP | 3349491 A1 | 7/2018 |

(Continued)

OTHER PUBLICATIONS

International Search Report and Written Opinion for PCT Application No. PCT/US2021/061232 dated Mar. 14, 2022, 13 pages.

(Continued)

*Primary Examiner* — Donald L Mills
(74) *Attorney, Agent, or Firm* — Polsinelli

(57) ABSTRACT

Systems, methods, and computer-readable media are disclosed for a scalable process for validating multiple paths used for routing network traffic in a network using segment routing. In one aspect, a method includes identifying, by a first network hop, one or more second network hops, for each of the one or more second network hops, determining a corresponding flow label, the corresponding flow label including a corresponding test packet for validating packet forwarding between the first network hop and a corresponding second network hop, and performing a validation process for validating packet forwarding from the first network hop to the corresponding second network hop using at least the corresponding flow label. The method further includes determining a queue of additional network hops to be validated based on a result of the validation process, and iteratively validating packet forwarding for each additional network hop in the queue.

20 Claims, 16 Drawing Sheets

(56) References Cited

U.S. PATENT DOCUMENTS

| | | | |
|---|---|---|---|
| 2014/0269266 A1 | 9/2014 | Filsfils et al. | |
| 2016/0127219 A1 | 5/2016 | Akhavain Mohammadi | |
| 2016/0164741 A1 | 6/2016 | Durgin et al. | |
| 2018/0077051 A1 | 3/2018 | Nainar et al. | |
| 2018/0351863 A1* | 12/2018 | Vairavakkalai | H04L 45/02 |
| 2019/0081897 A1 | 3/2019 | Shakir et al. | |
| 2019/0260657 A1 | 8/2019 | Filsfils et al. | |
| 2021/0092037 A1 | 3/2021 | Rathi et al. | |
| 2021/0367867 A1* | 11/2021 | Arora | H04L 43/10 |
| 2022/0103462 A1* | 3/2022 | Sidebottom | H04L 45/50 |
| 2022/0337506 A1* | 10/2022 | Zhu | H04L 43/10 |

FOREIGN PATENT DOCUMENTS

| | | |
|---|---|---|
| EP | 3382954 B1 | 10/2018 |
| EP | 3664386 A1 | 6/2020 |
| WO | 2017152112 A2 | 9/2017 |

OTHER PUBLICATIONS

Chen J., et al, "Hydrogel to Guide Chondrogenesis Versus Osteogenesis of Mesenchymal Stem Cells for Fabrication of Cartilaginous Tissues," Biomedical Materials, Published May 18, 2020, vol. 15, No. 4, 26 pages, [Retrieved on May 8, 2020], Retrieved from URL: https://doi.org/10.1088/1748-605X/ab401f.

International Search Report and Written Opinion for International Application No. PCT/US2021/051096, dated Dec. 27, 2021, 11 Pages.

International Preliminary Report on Patentability from Application No. PCT/US2021/061232, dated Jun. 15, 2023.

* cited by examiner

SYSTEMS AND METHODS FOR SCALABLE VALIDATION OF MULTIPLE PATHS IN A NETWORK USING SEGMENT ROUTING

CROSS-REFERENCES TO RELATED APPLICATIONS

This application is a continuation of U.S. application Ser. No. 17/112,663, filed on Dec. 4, 2020, which is hereby incorporated by reference, in its entirety and for all purposes.

TECHNICAL FIELD

The present technology pertains to network traffic routing in a network, and more specifically to validating multiple paths used for routing network traffic in an IPv6 network using segment routing.

BACKGROUND

The ubiquity of Internet-enabled devices has created an enormous demand for Internet services and content. We have become a connected society where users are increasingly reliant on network services and content. This Internet-connected revolution has created significant challenges for service and content providers who often struggle to service a high volume of user requests without falling short of user performance expectations. For example, cloud providers typically need large and complex datacenters to keep up with network and content demands from users. These datacenters are generally equipped with server farms configured to host specific services, and include numerous switches and routers configured to route traffic in and out of the datacenters. In many instances, a specific datacenter is expected to handle millions of traffic flows and service requests.

Such large volumes of data can be difficult to manage and route within a network. Part of such difficulty can be associated with the need for validating data paths between various network nodes that increase exponentially as the number of network nodes in a network increases.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
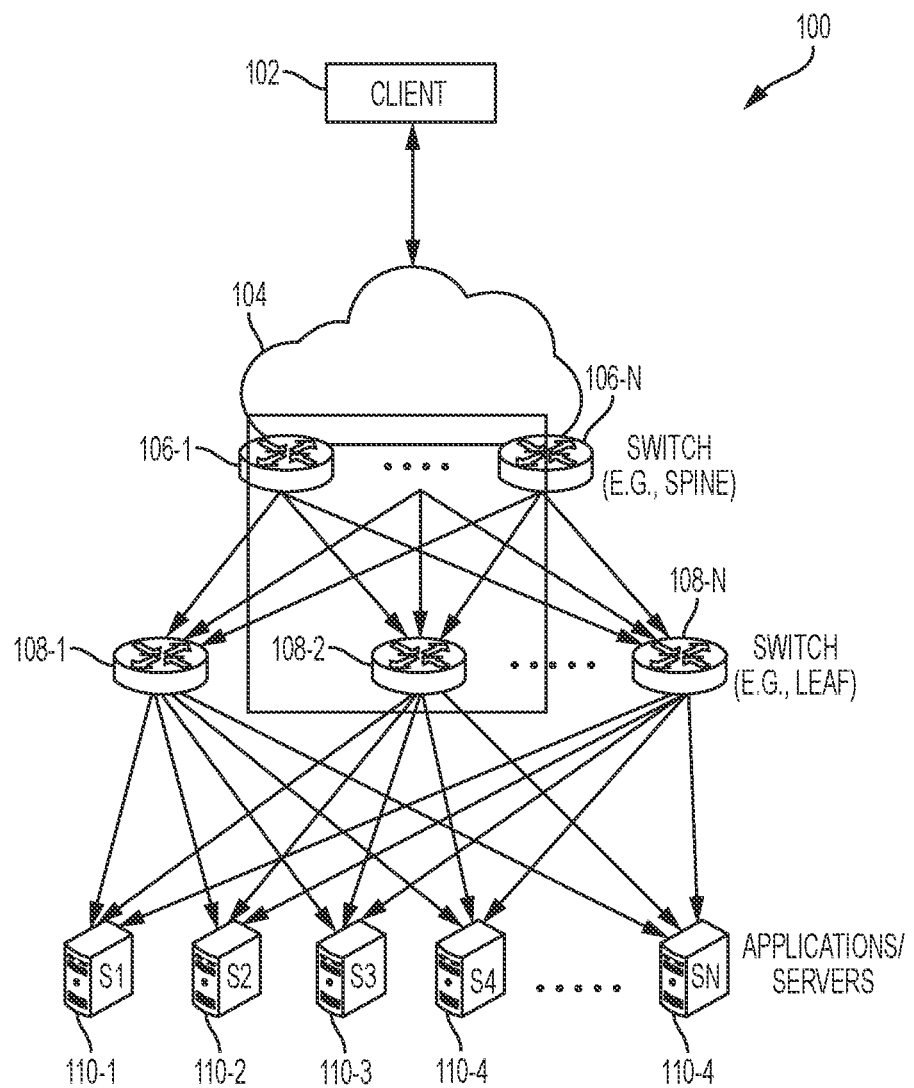
FIG. 1 illustrates a diagram of an example cloud data center architecture, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for a scalable process for validating multiple paths (e.g., Equal Cost Multiple Paths (ECMPs) used for routing network traffic in a network (e.g., in an IPv6 network) using segment routing (SRv6).

In one aspect, a method of validating packet forwarding on multiple paths includes identifying, by a first network hop, one or more second network hops, for each of the one or more second network hops, determining a corresponding flow label, the corresponding flow label including a corresponding test packet for validating packet forwarding between the first network hop and a corresponding second network hop, and performing a validation process for validating packet forwarding from the first network hop to the corresponding second network hop using at least the corresponding flow label. The method further includes determining a queue of additional network hops to be validated based on a result of the validation process, and iteratively validating packet forwarding for each additional network hop in the queue.

In another aspect, the validation process includes generating a validation data packet for the corresponding second network hop, the validation data packet including the corresponding flow label and a segment routing header identifying a Segment Identifier list (SID-list), sending the validation data packet through the first network hop, receiving a response data packet from the corresponding second network hop, and determining the result of the validation process as one of (1) successful packet forwarding from the first network hop to the corresponding second network hop when the response data packet includes a confirmation message, or (2) failure of packet forwarding from the first network hop to the corresponding second network hop when the message does not include the confirmation message.

In another aspect, determining the queue includes adding the corresponding second network hop to the queue if the result of the validation process is the successful packet forwarding from the first network hop to the corresponding second network hop.

In another aspect, iteratively validating the packet forwarding for each additional network hop in the queue includes selecting a network hop from the queue to yield a selected network hop, generating a corresponding query data packet for the selected network hop, receiving a response data packet in response to sending the query data packet to the selected network hop, and validating packet forwarding of the selected network hop based on the response data packet.

In another aspect, the corresponding query data packet includes a path instruction of a previous network hop of the selected network hop, and the response data packet includes a path instruction of the selected network hop, an identifier of one or more next hops of the selected network hop and a corresponding flow label for each of the one or more next hops of the selected network hop.

In another aspect, validating the packet forwarding of the selected network hop includes generating a validation data packet for validating packet forwarding of the selected network hop to each of the one or more next hops of the selected network hop, the validation data packet including the corresponding flow label and the path instruction of the previous network hop of the selected network hop, sending the validation data packet through the selected network hop, receiving a response data packet from a corresponding next hop of the selected network hop, and validating the packet forwarding of the selected network hop based on the response data packet.

In another aspect, each of the first network hop and the one or more second network hops is one of a router or a switch for routing data plane traffic of an IPv6 network using segment routing.

In one aspect, a device includes one or more memories including computer-readable instructions stored therein and one or more processors. The one or more processors are configured to execute the computer readable instructions to identify one or more network hops, for each of the one or more network hops, determine a corresponding flow label, the corresponding flow label including a corresponding test packet for validating packet forwarding between the device and a corresponding network hop, and perform a validation process for validating packet forwarding from the device to the corresponding network hop using at least the corresponding flow label. The one or more processors are further configured to execute the computer-readable instructions to determine a queue of additional network hops to be validated based on a result of the validation process, and iteratively validate packet forwarding for each additional network hop in the queue.

In one aspect, one or more non-transitory computer-readable media include computer-readable instructions, which when executed by one or more processors of a first network hop, cause the first network hop to identify one or more second network hops, for each of the one or more second network hops, determine a corresponding flow label, the corresponding flow label including a corresponding test packet for validating packet forwarding between the first network hop and a corresponding second network hop, and perform a validation process for validating packet forwarding from the first network hop to the corresponding second network hop using at least the corresponding flow label. The execution of the computer-readable instructions by the one or more processors further cause the one or more processors to determine a queue of additional network hops to be validated based on a result of the validation process, and iteratively validate packet forwarding for each additional network hop in the queue.

Description of Example Embodiments

As noted above, large volumes of data can be difficult to manage and route within a network. Segment routing is an example of a process used for routing traffic within a given network (e.g., in an IPv6 network such as an IPv6 centric data center). Segment Routing over IPv6 (SRv6) can steer data packets between two network codes in a network using a Segment Identifier (SID) in the SR Header (SRH). A SID-list can result in multiple paths between a source node and a destination node of data packets (e.g., Equal Cost Multiple Paths (EMCPs)). When a SID-list results in ECMPs, network nodes (which may be referred to as hops throughout this disclosure) can determine next hops for the data packets typically based on a hash value of a data packet. The hash values can be determined based on source and destination IP addresses, a flow label, source and destination ports, next header, etc. (e.g., this is an example 6-tuple used by Junos). Thus, different data packets traverse different end-to-end ECMPs based on the content of the data packets.

Before steering data packets using a SID-list, the SID-list may be validated. When validating a SID-list, each end-to-end ECMP of the SID-list is validated. Validation of an end-to-end ECMP can ensure links (between hops) on the end-to-end ECMP are operational, can ensure each hop on the end-to-end ECMP correctly forwards data packets with the SID-list, and can ensure reachability of the destination node via the end-to-end ECMP using the SID-list. Validation of a SID-list is performed by sending testing data packets with the SID-list via all end-to-end ECMPs, and confirming that the testing data packets can reach the destination node. Currently methods such as traceroute and ping may be used for validating a SID-list and associated ECMPs, which require calculation of flow labels for each egress interface of each node on the ECMPs and are computationally intensive as different vendors and router platforms use different hashing algorithms, load balancing algorithms, etc. As an example, when using a traceroute/ping method, the number of ping/traceroute packets increases exponentially with the number of ECMPs that are in series. For example, in a 5 node scenario (e.g., a headend node, a tailend node and 3 intermediary nodes) and assuming that there are 8 ECMPs between nodes 1 and 3, and 10 ECMPs between nodes 3 and 5, the total number of end-to-end ECMPs is 8×10=80. Hence, 80 ping packets are sent out. To test using traceroute over each end-to-end ECMP, 8×10×4=320 traceroute packets are generated and sent. Moreover, if there is an ECMP path with nodes or links that are not in the headend's topology database due to static configurations, etc., such ECMP may be missed and hence not tested. Another available method is MPLS LSP multipath tree trace, which is not applicable for SRv6 data plane.

As described in more detail below, the present disclosure provides systems, methods and computer-readable media for validating end to end packet forwarding on SRv6 data plane for a SID-list that utilizes one or more ECMPs. Example advantages of the disclosed technologies for validating multiple paths include a significant reduction in the number of flow labels requires for a complete validation (e.g., one flow label per next hop), a linear increase in the number of test packets with an increase in the number of single-hop links on the end to end ECMPs of a SID list (as opposed to an exponential increase associated with methods described above), and using the same encapsulation as the data traffic for testing all paths between a headend and a tailend. This advantages are more evident in massively scaled networks that have 128 or more ECMPs between two network nodes.

Figure 2:
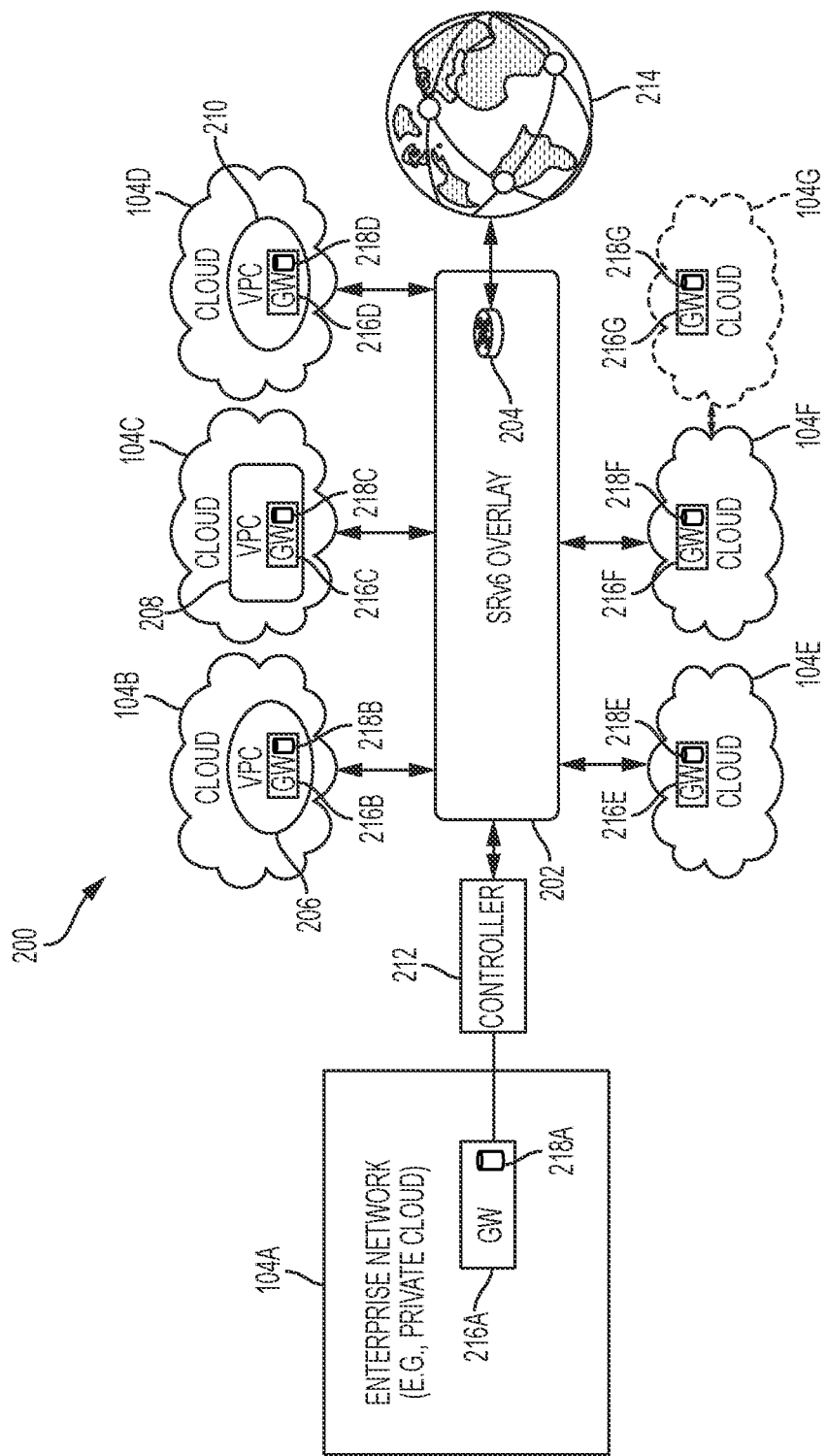
FIG. 2 illustrates a diagram of an example multi-cloud environment with an SRv6 overlay, according to some aspects of the present disclosure.

The present technology will be described in the following disclosure as follows. The discussion begins with an overview of SRv6 and IPv6. A description of an example cloud data center architecture and an example multi-cloud environment with an SRv6 overlay, as illustrated in FIGS. 1 and 2, will then follow. A description of example IPv6 and SRv6 packets and their corresponding flow will then be described with reference to FIGS. 3 and 4. The present technology and the example validation processes are then described with reference to FIGS. 5A-5H and FIG. 6. The discussion concludes with a description of an example network device and example computing devices, as illustrated in FIGS. 7A-B, including example hardware components suitable for hosting software applications and performing computing operations. The disclosure now turns to an overview discussion of IPv6 and SRv6.

The approaches herein can utilize segment routing (SR) to steer connection or communication requests between two network nodes such as servers or nodes on different clouds or cloud regions. IPv6 and SR, which are further described below, can be used to steer requests efficiently while limiting state information. The request will be routed to the nodes identified in the SR packet based on the IPv6 and SRv6 headers. The IPv6 header can include a Source Address (SA) and a Destination Address (DA), such as a destination server or node. An SR Header (SRH) can include a SID-list of SR nodes (e.g., S1, S2, S3, etc.) and a Segment Left (SL) counter which identifies the number of remaining destination servers or nodes.

IPv6 Environment

In an IPv6 environment, such as an IPv6-centric data center, network nodes (e.g., servers) can be reached via an IPv6 physical prefix. For example, servers can run application services in isolated environments, such as virtual machines (VMs) or software containers, which can be assigned an IPv6 virtual address (VIP). In some cases, a virtual switch (e.g., Open vSwitch, vector packet processing, etc.) can be deployed on a server to route packets between physical and virtual interfaces on the server. This allows the network (e.g., data center) to be fully Layer-3 routed, without having to deploy Layer-2 tunnels such as VLANs or VXLANs.

Routing the VIPs corresponding to the different applications running in the data center can be achieved in several manners. In some examples, the virtual switches can run Interior Gateway Protocol (IGP) to propagate direct routes to the VIPs. Other examples may use a mobility protocol, such as Identifier-Locator Addressing for IPv6, wherein edge routers perform the translation between physical and virtual addresses. Moreover, network devices can use Border Gateway Protocol (BGP) to exchange routing information. As will be further explained below, the approaches herein implement segment routing to establish and manage connectivity between clouds.

Segment Routing (SR)

SR is a source-routing paradigm, initially designed for traffic engineering, which allows for a packet to follow a predefined path, defined by a list of segments (a SID list), inside an SR domain. The approaches herein leverage an SRv6 architecture and IPv6 connectivity to efficiently create and manage multi-cloud connectivity.

SRv6 and IPv6 can be leveraged together by implementing an IPv6 and SRv6 header in an IPv6 packet. For example, in some cases, an IPv6 extension header can be implemented to identify a list of segments for SR and a counter Segments Left, indicating the number of remaining segments to be processed until the final destination of the packet is reached. In an SRv6 packet, the IPv6 destination address can be overwritten with the address of the next segment. This way, the packet can go through SR-capable routers until reaching the next intended SR hop. Upon receipt of an SRv6 packet, an SR-capable router will set the destination address to the address of the next segment, and decrease the Segments Left counter. When the packet reaches the last SR hop, the final destination of the packet is copied to the IPv6 destination address field. Depending on the value of a flag in the header, the SRv6 header can be stripped by the last SR hop so that the destination receives a vanilla IPv6 packet.

FIG. 1 illustrates a diagram of an example cloud data center architecture, according to some aspects of the present disclosure. Architecture 100 can be implemented by one or more clouds in a multi-cloud environment. Architecture 100 is an example of a network in which SRv6 and IPv6 can be leveraged. However, the present disclosure is not limited thereto and can be applied to any other type of known or to be developed network in which SRv6 and IPv6 can be leveraged.

The cloud data center architecture 100 can include a cloud 104, which can be a private cloud, a public cloud, a hybrid cloud, a virtual private cloud (VPC), a cloud region, etc. The cloud 104 can host one or more data centers and/or networks. For example, the cloud 104 can include a single data center or a plurality of data centers. The cloud 104 can be physically located in one geographic location or distributed throughout multiple geographic locations. Moreover, the cloud 104 can include forwarder-side and server-side architectures or components.

The cloud 104 switches 106-1 through 106-N (collectively "106" hereinafter) and 108-1 through 108-N (collectively "108" hereinafter) configured to route traffic in the cloud data center architecture 100. The switches 106, 108 can include any network device with layer 2 (L2) and/or layer 3 (L3) capabilities. In this example, the switches 106 represent spine switches and the switches 108 represent leaf switches.

The client 102 can connect to the cloud 104 and access application servers 110-1 through 110-N (collectively "110" hereinafter) via the switches 106, 108. The client 102 can be a network, such as a cloud network or data center (e.g., a private cloud, a public cloud, a hybrid cloud, a cloud region or segment, a virtual private cloud, etc.), or any computing device, such as a laptop, a desktop, a tablet computer, a mobile phone, a server, a smart device (e.g., smart television, smart watch, etc.), an internet of things (IoT) device, etc.

The switches 106 can serve as edge devices in the cloud 104, and route traffic to and from the cloud 104. The switches 106 can thus serve as the egress and ingress point for the cloud 104. The switches 106 can also route traffic to the switches 108 in the cloud 104, which can route traffic to other nodes (e.g., appliances, firewalls, load balancers, etc.) and application servers 110 in the cloud 104.

The application servers 110 can represent physical machines and/or resources hosting applications, isolated environments, or services in the cloud 104. For example, the application servers 110 can be physical servers running various applications in the cloud 104. The application servers 110 can run some or all of their applications in isolated environments, such as VMs or software containers. In some cases, an application can by hosted by, and/or run on, multiple application servers 110 in the cloud 104. For example, multiple application servers 110 can run instances of an application (e.g., virtual instances, replicas, parallel instances, mirror instances, etc.).

The application servers 110 can include a physical network interface (e.g., NIC) to communicate with other devices or services (e.g., devices or services in the cloud data center architecture 100). The physical network interface can be assigned a physical prefix or network address for such communications. The application servers 110 can also include one or more virtual interfaces (e.g., vNICs) which can provide virtualized or abstract representations of network interfaces and connections. Virtual interfaces can provide added flexibility and network capabilities, as well as various other benefits or services, such as aggregation of links or data, isolation of data or networks, decoupling of application and system traffic, expansion of network interfaces, network redundancy, dedicated links, and so forth. Virtual interfaces can be assigned virtual addresses (e.g., VIPs) in the cloud 104. The virtual addresses can identify the virtual interfaces as well as any applications or isolated environments associated with the virtual addresses on the application servers 110.

For example, an application can be assigned a virtual address in the cloud 104, which can be used to identify the application in the cloud 104 and route traffic to and from the application. The virtual address can be used to steer traffic to and from a virtual instance of the application running on one or more of the application servers 110. In some cases, the virtual address can be mapped to the same application on multiple application servers 110, and can be used to communicate with an instance of the application on any of the multiple application servers 110.

In some cases, the application servers 110 can include a virtual switch, such as OVS or VPP, which can route traffic to and from the application servers 110. For example, a virtual switch can route traffic between physical and virtual network interfaces on an application server, between applications and/or isolated environments on the application server, and between the application server and devices or applications outside of the application server. To illustrate, an application server can run multiple workloads (e.g., applications in different VMs or containers) assigned to different virtual interfaces and virtual addresses. A virtual switch on the application server can route traffic to and from the different workloads by translating the virtual addresses of the workloads and communicating with the virtual interfaces as well as other network interfaces such as the physical network interface(s) on the application server.

FIG. 2 illustrates a diagram of an example multi-cloud environment with an SRv6 overlay, according to some aspects of the present disclosure. The multi-cloud environment 200 includes clouds 104A-G interconnected through an SRv6 overlay 202 which routes traffic between the clouds 104A-G using SRv6. In this example, cloud 104A represents a private cloud or site, and clouds 104B-G represent public clouds. Moreover, the clouds 104B, 104C, 104D include virtual private clouds (VPCs) 206, 208, 210 configured for cloud 104A and hosted by the clouds 104B, 104C, 104D. Clouds 104E-G, as illustrated in this example, do not include VPCs associated with cloud 104A. However, as described below, the approaches herein can allow VPCs to be created for cloud 104A on any of the clouds 104E-G.

A controller 212 can interact with gateways 216A-G on clouds 104A-G to collect topology information, perform path computation, propagate routes across the clouds 104A-G and/or VPCs 206-210, propagate segment routing identifiers (SIDs) and policies across the clouds 104A-G and/or VPCs 206-210, perform traffic engineering, etc. The controller 212 can be, for example, a BGP controller with a path computation engine. The controller 212 can reside on cloud 104A or any other network or cloud. The gateways 216A-G can be, for example, virtual gateways available at the clouds 104A-G. In some cases, the virtual gateways can include a vector packet processing engine (VPP).

The controller 212 can collect topology information from the clouds 104A-G and/or VPCs 206-210 and propagate forwarding rules and SR IDs (e.g., SIDs) and policies using one or more protocols such as OSPF (Open Shortest Path First), IS-IS (Intermediate System to Intermediate System), BGP Link-State (BGP-LS), BGP Traffic Engineering (BGP-TE), etc. For example, the controller 212 can collect topology information for the clouds 104A-G and/or VPCs 206-210 from gateways 216A-G using BGP-LS protocol. The controller 212 can also include a path computation engine (PCE) for computing the best paths between the gateways 216A-G. The controller 212 can use the collected topology and/or cloud information to perform the path computation. The controller 212 can then use BGP-TE to populate reachability information, such as forwarding rules and SR IDs and policies, on the gateways 216A-G.

The gateways 216A-G can include a control plane that interfaces with BGP-LS and BGP-TE to receive the forwarding rules and SR IDs policies from the controller 212. The gateways 216A-G can also include a data plane that processes IPv4 and/or IPv6 packets and is able to encapsulate/decapsulate IPv4 or IPv6 packets into SRv6 packets. Moreover, the gateways 216A-G can include BGP agents 218A-G, such as GoBGP agents, to interact with the controller 212 or any BGP peers. In some cases, the gateways 216A-G can also include an active measurement system based on IP SLA (Internet Protocol Service Level Agreement) to collect network performance information and monitor quality-of-service (QoS) between the gateways 216A-G.

The controller 212 can communicate with the clouds 104A-G via IPv4 or IPv6. The SRv6 overlay 202 can include SRv6-capable nodes that can route traffic over the SRv6 overlay 202 using SRv6, as further explained below.

Figure 3A:
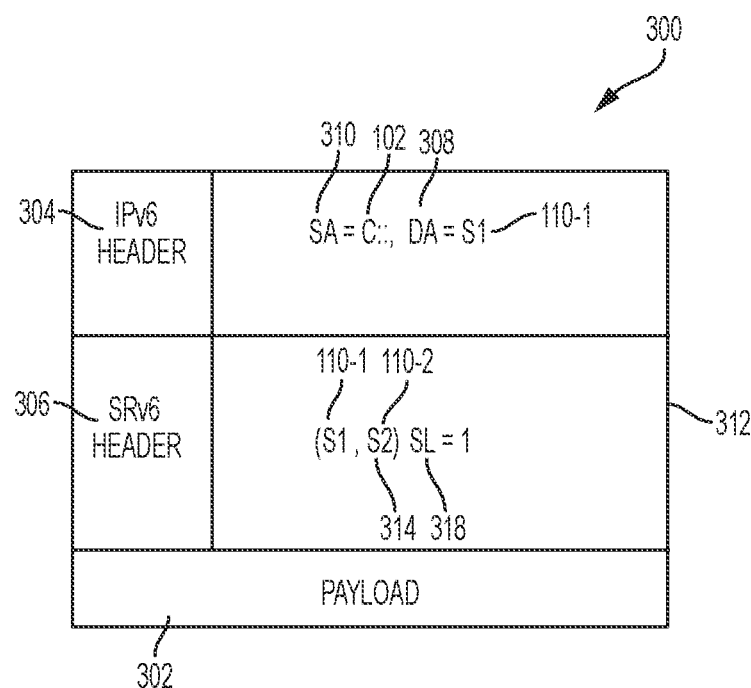
FIG. 3A illustrates an example IPv6 and SRv6 packet, according to some aspects of the present disclosure.

FIG. 3A illustrates an example SRv6 packet, according to some aspects of the present disclosure. SRv6 packet 300 for traffic routed via the SRv6 overlay 202. The SRv6 packet 300 includes a payload 302, an IPv6 header 304, and an SR header 306. The SR header 306 can include a segments field 312 containing a list of segments 314 or SR list. The list of segments 314 can include a set of destination nodes for the SRv6 packet 300. For example, the list of segments 314 can include application server 110-1 (S1) and application server 110-2 (S2) from the cloud 104 shown in FIG. 1. The destination nodes in the list of segments 314 can reside on one cloud (e.g., 104) or multiple clouds (e.g., 104A-G). The list of segments 314 can also include a respective function for each segment, as further described below with reference to FIG. 3B.

The list of segments 314 in the SR header 306 can be used by nodes in the SRv6 overlay 202 to steer the packet 300 to the destination nodes (e.g., application servers 110-1 and 110-2) in the list of segments 314. The list of segments 314 identifies each segment (e.g., SRv6-capable node) along a path for the packet. Each SRv6-capable node can maintain a list of SRv6 segments instantiated at the node. The SRv6-capable node can use its list of SRv6 segments to route the packet to the next segment in the list of segments 314.

The segments field 312 can also include a counter 318, known as the Segments Left, which identifies the active segment. The value of the counter 318 is decreased by 1 each time it is received by an SRv6-capable node as the packet travels through the IPv6 network.

The IPv6 header 304 can include a source address field 310 and a destination address field 308. The source address field 310 can identify the source of the packet 300, such as client 102. The source address field 310 can include a network address of the original source of the packet 300, a return destination for the packet 300, and/or a current source or sender of the packet 300. The source field 310 can also include commands or functions to be implemented by the node identified in the source field 310, as will be further described below.

The destination address field 308 can identify the next segment or node from the list of segments 314. In this example, the destination address field 308 identifies server 110-1 (S1) which is the first destination node in the list of segments 314 for the packet 300. The destination address field 308 can be used to steer the packet 300 to the next destination. The destination field 308 in the IPv6 header 304 can allow the packet 300 to be routed even if the packet 300 traverses SR-unaware nodes.

The destination address field 308 can include a network prefix of the identified node or segment. For example, the destination address field 308 can include the physical prefix of server 110-1 (S1). This can ensure that the packet 300 is transmitted to that node or segment (e.g., server 110-1 (S1)), as the first destination for the packet 300. After the server 110-1 (S1) processes the packet 300, the server 110-1 (S1) can forward the packet 300 to the next segment in the list of segments 314, which in this example is server 110-2 (S2). When forwarding the packet, the server 110-1 (S1) can overwrite the destination address field 308 on the IPv6 header 304 to identify the server 110-2 (S2) as the destination, which ensures that the packet 300 is routed to server 110-2 (S2). Server 110-2 (S2) can then receive the packet 300 based on the destination address field 308. This way, the list of segments 314 in the SR header 306 as well as the destination address field 308 in the IPv6 header 304 can be used to push the packet 300 to the destination nodes in the list of segments 314.

As will be further explained, the list of segments 314 and/or destination address field 308 can include functions or commands (hereinafter "SR functions") to be implemented by associated nodes or segments. For example, the destination address field 308 can identify application server 110-1 (S1) and include a function to be applied by application server 110-1 (S1), such as a connect function which application server 110-1 (S1) can interpret as a request to connect with an application or node associated with the function. The destination address field 308 can contain the state of the packet 300, including the next destination of the packet, the source or return node, and any commands or functions for such nodes or segments.

Similarly, the list of segments 314 can include commands or functions for the segments in the list of segments 314. For example, the list of segments 314 can include a connect function for each of the destination node or segment, a force connect function for the last segment in the list of segments 314, one or more parameters for one or more segments (e.g., resource identifier, flow identifier, etc.), state information, and so forth.

SR functions can encode actions to be taken by a node directly in the SR header 306 and/or the IPv6 header 304. SR functions are executed locally by the SRv6-capable nodes. Example SR functions include, without limitation, End (i.e., endpoint function), End.X (i.e., endpoint function with Layer-3 cross-connect), End.T (i.e., endpoint function with specific IPv6 table lookup), End.S (i.e., endpoint in search of a target in table T), End.B6 (i.e., endpoint bound to an SRv6 policy), etc. For example, in an SR header (306) containing s::cj, s::cj denotes the shortest-path to the node s and an x-connect function (function c) to the neighbor j.

In some examples, each node can be assigned an entire IPv6 prefix. Accordingly, the lower-order bytes in the prefix can be used to designate different SR functions. In some cases, the SR functions may depend on the address of the first segment in the list of segments 314 (e.g., the "sender" of the function). To illustrate, when a node whose physical prefix is s receives a packet with the SR header 306 containing (x, . . . , s::ƒ, . . . ), the SR header 306 will trigger node s to perform a function ƒ with argument x, denoted by s.f(x).

Figure 3B:
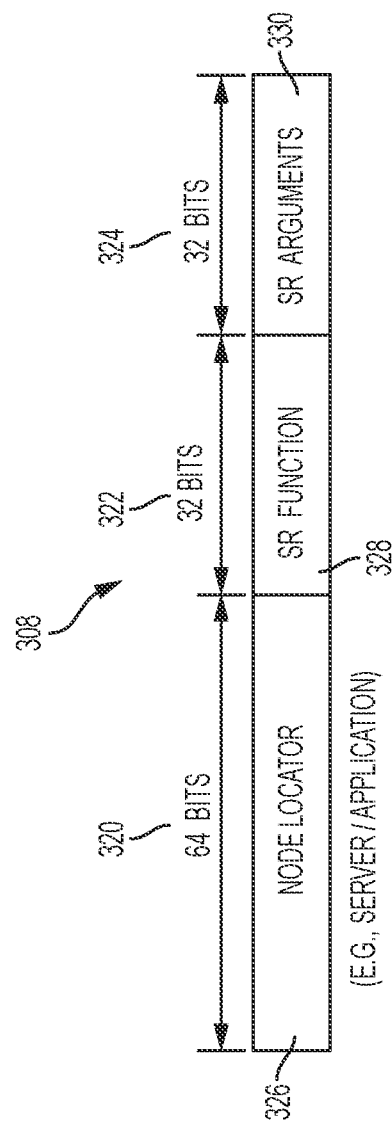
FIG. 3B illustrates a schematic diagram of an example destination field in an IPv6 and SRv6 header, according to some aspects of the present disclosure.

FIG. 3B illustrates a schematic diagram of an example destination address field in an IPv6 header, according to some aspects of the present disclosure. Destination address field 308 can include 128 bits, which can be segmented to include a first segment 320 from the first 64 bits for the node prefix 326, a second segment 322 from the next 32 bits for an SR function 328, and a third segment 324 from the next 32 bits to include any arguments 330 for the SR function 328. While this example illustrates the destination address field 308 segmented into a segment of 64 bits, a segment of 32 bits, and a segment of 32 bits, it should be noted that the destination address field 308 allows for flexible bit selection and thus can be segmented in other ways. The example in FIG. 3B is provided for illustration and explanation purposes.

The node prefix 326 can include the physical prefix of the next segment or node. The SR function 328 can include a command or function associated with the node prefix 326. In some cases, the third segment 324 can be further segmented into sub-segments which can include arguments for the SR function 328. The arguments can be used to pass specific parameters for the SR function 328.

Figure 4:
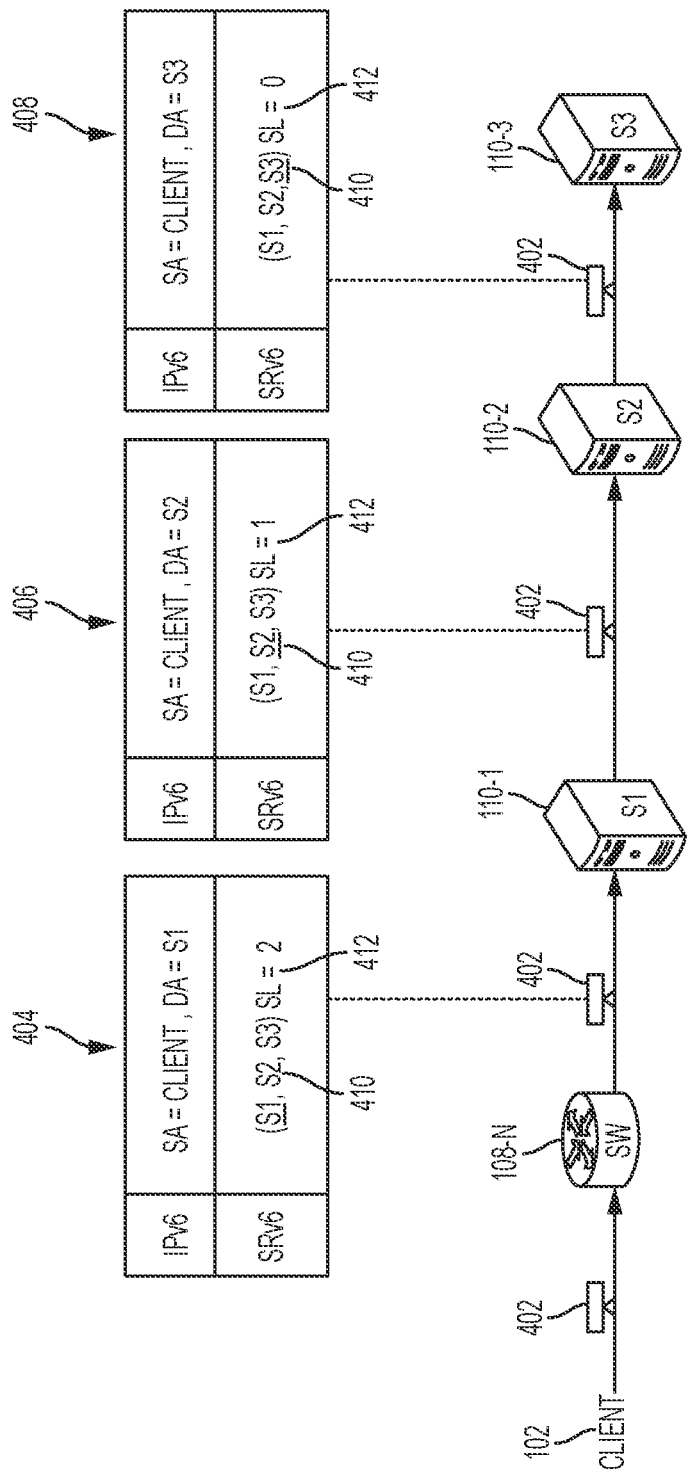
FIG. 4 illustrates an example flow of SRv6 traffic, according to some aspects of the present disclosure.

FIG. 4 illustrates an example flow of SRv6 traffic, according to some aspects of the present disclosure. FIG. 4 illustrates an example flow of SRv6 traffic (e.g., SRv6 packet 300) based on corresponding IPv6 and SRv6 headers 404, 406, 408. In this example, a client 102 sends a packet 402 to switch 108-N. The packet 402 can identify the client device 102 as the source (can be referred to as a source node) and a destination address for the traffic (can be referred to as a destination node).

The switch 108-N can receive the packet 402 and forward the packet to application server 110-1 (S1) based on the IPv6 and SRv6 headers 404. The SRv6 header in the headers 404 can include a list of segments (a SID-list) 410 identifying application servers 110-1, 110-2, 110-3 as the destination segments. The SRv6 header can in the headers 404 can also include a segments left (SL) counter 412 identifying the number of remaining segments or hops in the list of segments 410.

The application server 110-1 (S1) can receive the packet 402 from the switch 108-N and process it. The application server 110-1 (S1) can then forward the packet 402 to application server 110-2 (S2), which is the next segment in the list of segments 410, based on the list of segments 410 in the headers 406. The application server 110-1 (S1) can also decrease the SL counter 412 identifying the number of remaining segments or hops in the list of segments 410.

The application server 110-2 (S2) can receive the packet 402 from the application server 110-1 (S1) and process it. The application server 110-2 (S2) can then forward the packet 402 to application server 110-3 (S3), which is the next segment in the list of segments 410, based on the list of segments 410 in the headers 408. The application server 110-2 (S2) can also decrease the SL counter 412 identifying the number of remaining segments or hops in the list of segments 410.

The application server 110-3 (S3) can receive the packet 402 from the application server 110-2 (S2) and process it. The application server 110-3 (S3) is the last segment in the list of segments 410. Accordingly, the application server 110-3 (S3) can decrease the SL counter 412 identifying the number of remaining segments or hops in the list of segments 410, without forwarding the packet to another destination segment.

With example networks and flow of SRv6/IPv6 packets described above with reference to FIGS. 1-4, the disclosure now turns to systems and techniques for validating multiple paths (e.g., Equal Cost Multiple Paths (ECMPs)) in SRv6 data plane before using such multiple paths to carry packet forwarding.

FIGS. 5A-5H illustrate various stages of validating multiple paths for packet forwarding over SRv6 data plane, according to some aspects of the present disclosure.

Figure 5A:
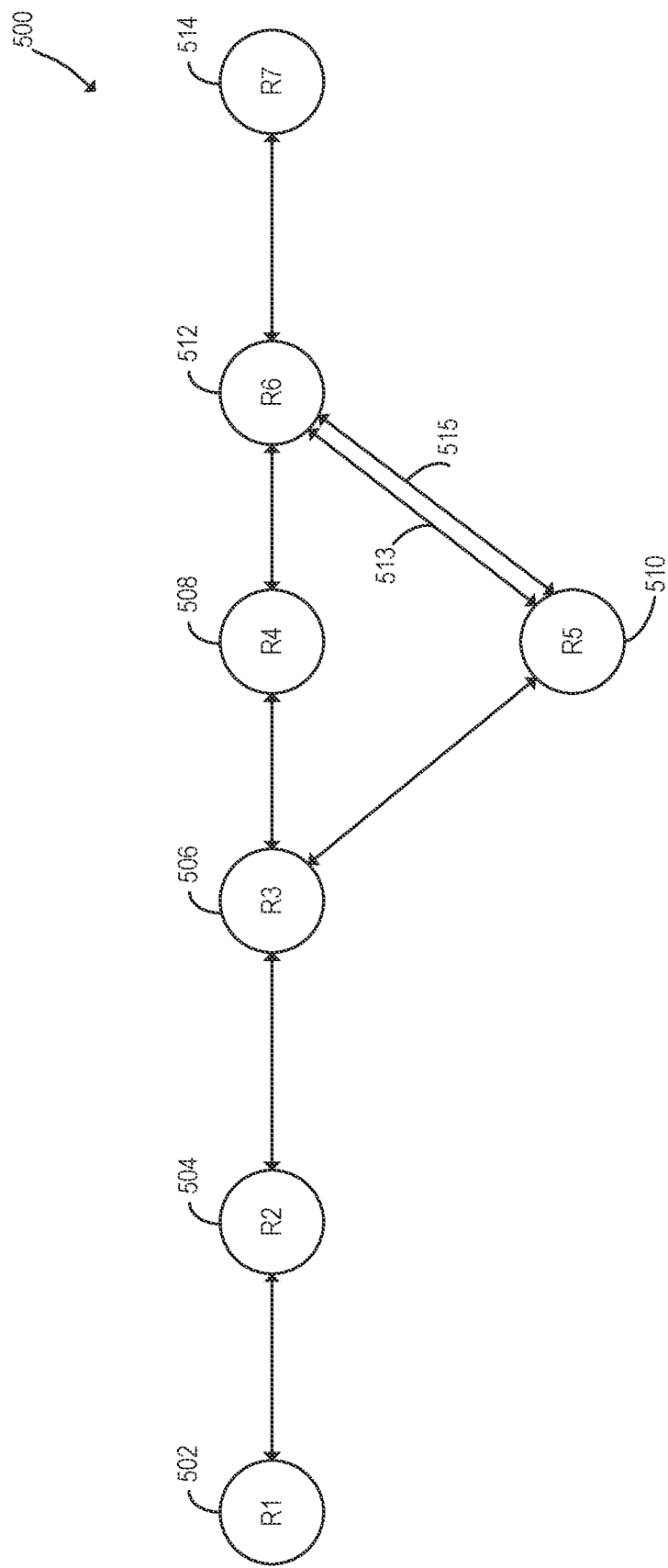
FIGS. 5A-5H illustrate various stages of validating multiple paths for packet forwarding over SRv6 data plane, according to some aspects of the present disclosure.

FIG. 5A illustrates a non-limiting example structure 500 where node 502 can be a source node (e.g., a user terminal, a server, etc.) with data traffic to be forwarded to node 514 that can be a destination node (e.g., a different user terminal, a different server, etc.). Nodes 504, 506, 508, 510 and 512 can be network elements (e.g., switches and/or routers) that use segment routing for carrying network traffic from source node 502 to source node 514. Each of nodes 504, 506, 508, 510 and/or 512 may be referred to as a hop. Node 504 may be referred to as a headend node (or headend hop). Nodes 506, 508 and 510 may be referred to as intermediate nodes (or intermediate hops). Node 512 may be referred to as a tailend node (or a tailend hop). In example of FIG. 5A, each of nodes 502 to 514 have a second alternative designation that corresponds to the prevalent literature on segment routing. For example, node 502 may also be designated and/o referred to as R1, node 504 may also be designated and/o referred to as R2, node 506 may also be designated and/o referred to as R3, node 508 may also be designated and/o referred to as R4, node 510 may also be designated and/o referred to as R5, node 512 may also be designated and/o referred to as R6 and node 514 may also be designated and/o referred to as R7.

In this non-limiting example of FIG. 5A, headend node 504 may utilize an example SRv6 policy with SID list <S3,S6> for sending network traffic from node 502 to an egress of node 512 to be forwarded to node 514. A SID-list <S3,S6> can identify the nodes that may form one or more multiple paths that will be traversed by packets originating from node 502 and destined for node 514, once validated. Example SID-list <S3,S6> can indicate for headend node 504 that the initial hop is S3 (node 506) and the final hop is S6 (node 512). Within the context of FIG. 5A, three examples of multiple paths (e.g., ECMPs) are shown including a path formed by nodes 504, 506, 508 and 512; a path formed by nodes 504, 506, 510 and 512 using the top link 513 between nodes 510 and 512; and a path formed by nodes 504, 506, 510 and 512 using the bottom link 515 between 510 and 512, etc. As described above, the present disclosure provides systems and techniques for validating all multiple paths between a source node and a destination node over a SRv6 data plane before routing network traffic there through. Various stages of validation techniques of the present disclosure will be described with reference to FIGS. 5A-H. As will be described below, node 504 performs a two-step process on each of nodes 506, 508, 510 and 512 to complete an end-to-end validation of multiple paths (EMCPs). The first step is a query process for identifying information on one or more next hops. The second step is a validation (testing) process for validating their respective packet forwarding capabilities.

Initially, node 504 can validate its own packet forwarding capabilities. In doing so, node 504 can query packet forwarding interface of node 504 to identify one or more next hops for first node in the SID-list (e.g., S3 in SID list <S3, S6>). In this example, there is one next hop, node 506, with address A3_21. Address A3_21 can be derived from a format Axyn, designating IPv6 interface IP of node x for $n^{th}$ link between node x and node y. Then node 504 can determine a (calculate) a flow label for a test data P2 to be forwarded to node 506 for testing IP forwarding of node 504. For example, node 502 can calculate the flow label as F2_P2_31. Flow label F2_P2_31 can be derived from Fx_p_yn that is a flow label resulting in node x forwarding packet p to node y via $n^{th}$ link. Moreover, node 504 can determine a path instruction (e.g. END.X SID with decapsulation) for node 504, which can be S2_31. END.X SID S3_21 can be derived from Sx_yn that is END.X SID (with decapsulation) of node x for nth adjacency between x and y.

Figure 5B:
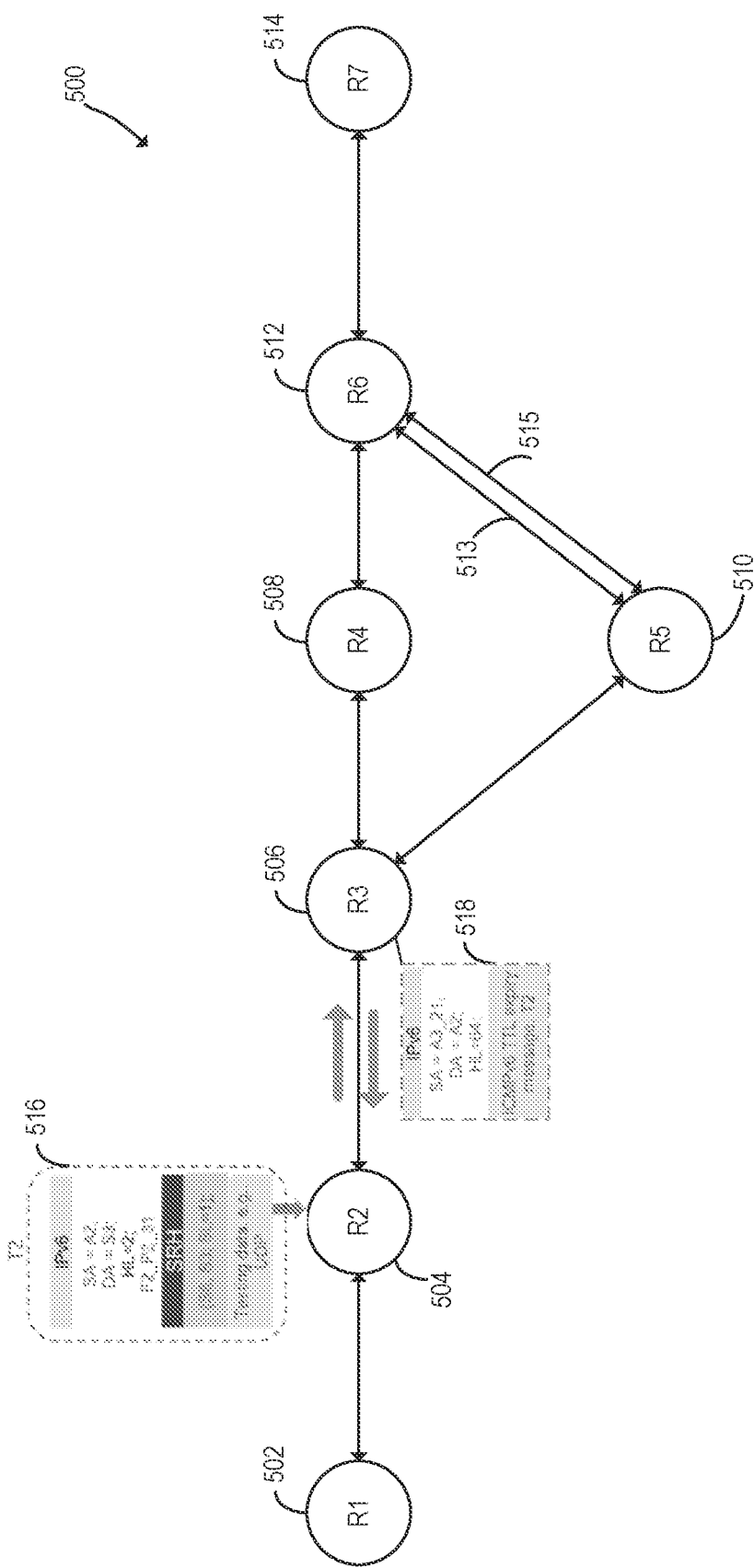

FIG. 5B illustrates an example process whereby node 504 can validate packet forwarding capability of node 504. In doing so, node 504 can generate a testing data packet T2 (shown as data packet 516 in FIG. 5B) that includes P2 and the flow label determined for node 506, as described above. Testing data packet 516 can also include testing data (e.g., User Datagram Protocol (UDP) used as P2). In another example, testing data packet 516 can be provided to node 504 (e.g., by a network controller, e.g. controller 212 of FIG. 2). For example, testing data packet T2 can be determined as:

T2: (A2, S3; HL=2; F2_P2_31)(S6, S3; SL=1)

where A2 is the IPv6 loopback of node 504, S3 is the segment ID of node 506, HL is hop limit; F2_P2_31 is the flow label calculated above, S6 is the segment ID of the last hop (e.g., node 512) in SID list, and SL is the number of segments left. As shown in FIG. 5B, node 504 can provide testing data packet 516 to IP forwarding of node 504 and wait for a data packet 518. In one example, data packet 518 can include an IPv6 header with SA (e.g., router ID of node 506), a DA (router ID of node 504) and HL parameter (e.g., HL=64). Data packet 518 can also include an ICMPv6 TTL expiry message from node 506. Reception of data packet 518 with a TTL expiry message from node 506 and source IP of A3_21 can validate that node 504 can correctly forward packets with the SID-list <S3, S6>. If a TTL expiry message is not received with data packet 518, an error message may be generated by node 504 indicating that packet forwarding to node 506 has failed.

Having validated packet forwarding to node 506, node 504 can then perform a two-step process to query node 506 and identify next hops of node 506 (as described below with reference to FIG. 5C) followed by validating packet forwarding of node 506 to such nodes if applicable (as described below with reference to FIG. 5D).

Figure 5C:
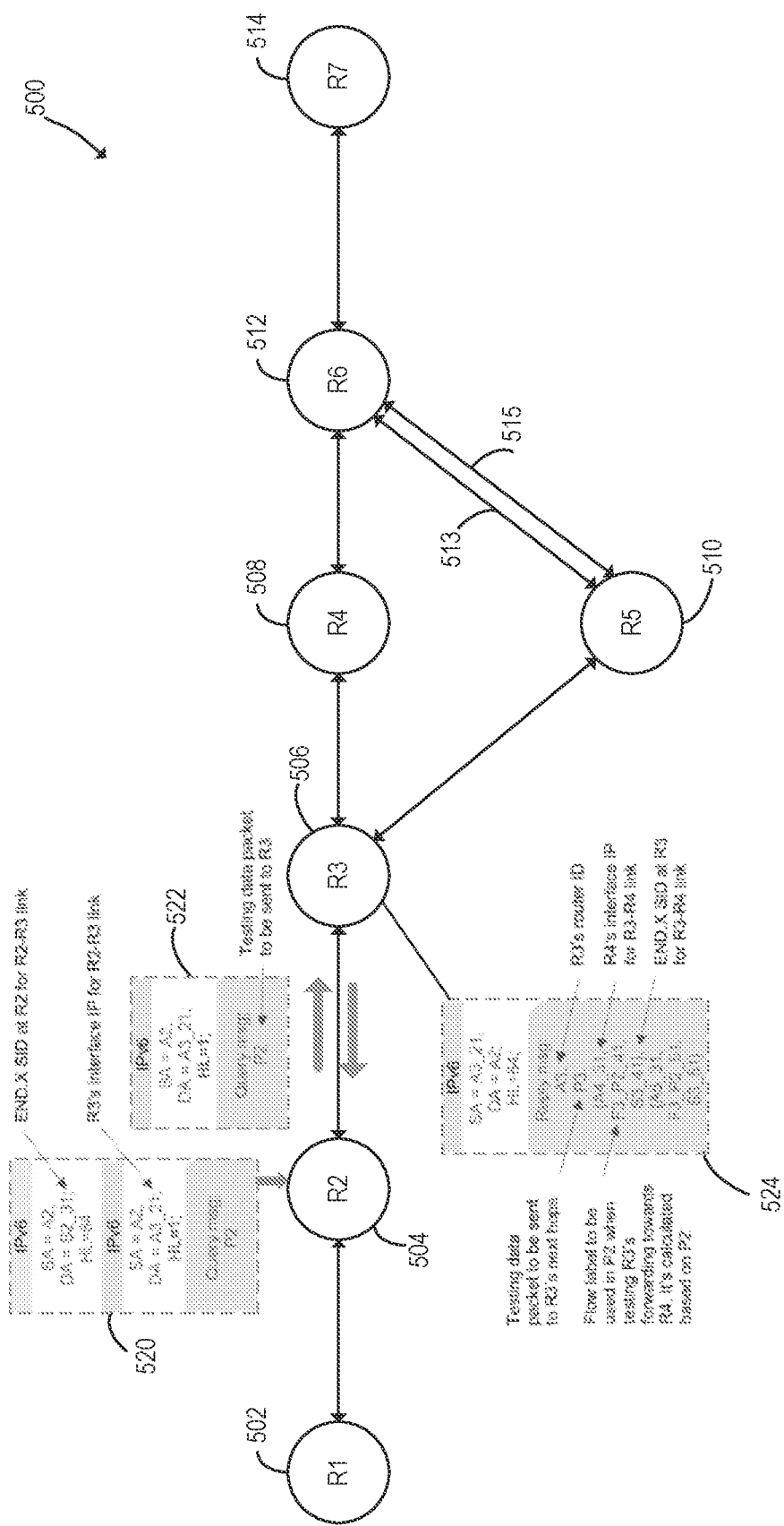

As shown in FIG. 5C, node 504 can send a query data packet 520 to node 506 to request information on multiple paths (ECMPs) of node 506. Data packet 520 can be generated at node 504 or can be provided to node 504 (e.g., by a network controller, e.g. controller 212 of FIG. 2). Data packet 520 can include a SA (e.g., router ID of node 504), a DA that can be path information of previous hop of node 506 (e.g., END.X SID of node 504) and other information such as HL parameter (e.g., HL=64) in an outer IPv6 header of data packet 520. Data packet 520 can also include an inner IPv6 header with information including SA (e.g., router ID of node 504), interface IP for a link between nodes 504 and 506, HL parameter (e.g., HL=1), testing data P2. Outer IPv6 header of data packet 520 may be removed at IP forwarding interface of node 504 before being forwarded (shown as data packet 522 in FIG. 5C) to node 506.

Node 506 can then send a data packet 524 back to node 504 that includes information on next nodes (hops) of node 506 (e.g., node 508 (R4) and node 510 (R5)). In one example, data packet 524 can include an IPv6 header with SA (e.g., IPv6 interface IP of node 506), a DA (router ID of node 504) and HL parameter (e.g., HL=64). Data packet 524 can also include a reply message with identification of router ID of node 506, interface IP of its next hop(s) (e.g., node 508 and node 510), flow labels for its next hop(s) (e.g., node 508 and node 510), and a test data P3 (similar to test data P2). Test data P3 may be generated by node 506 by updating P2's DA, SRH and SL as if P2 is processed by IP forwarding interface of node 506. For example, a P2 such as (A2, S3; HL=2) (S6, S3; SL=1) can be modified as shown below to generate:

P3: (A2, S6; HL=2) (S6, S3; SL=0).

Next and upon receiving reply data packet 524, node 504 can validate IP forwarding of node 506. As shown in FIG. 5D, node 504 can generate testing data packets such as testing data packet 526 (T31). In another example, testing data packet 526 can be provided to node 504 (e.g., by a network controller, e.g. controller 212 of FIG. 2). Data packet 526 can include an outer IPv6 header that is the same as outer IPv6 header of data packet 520 described above with reference to FIG. 5C. Inner IPv6 header of testing data packet 526 can include SA (e.g., router ID of node 504) and DA (e.g., SID of node 506), HL parameter (e.g., HL=2), and flow label for node 508 (received by node 504 as part of reply message in data packet 524 described above with reference to FIG. 5C). Data packet 526 can also include an SRH with SID-list and SL parameter (e.g., SL=1), and testing data (e.g., User Datagram Protocol (UDP)).

Figure 5D:
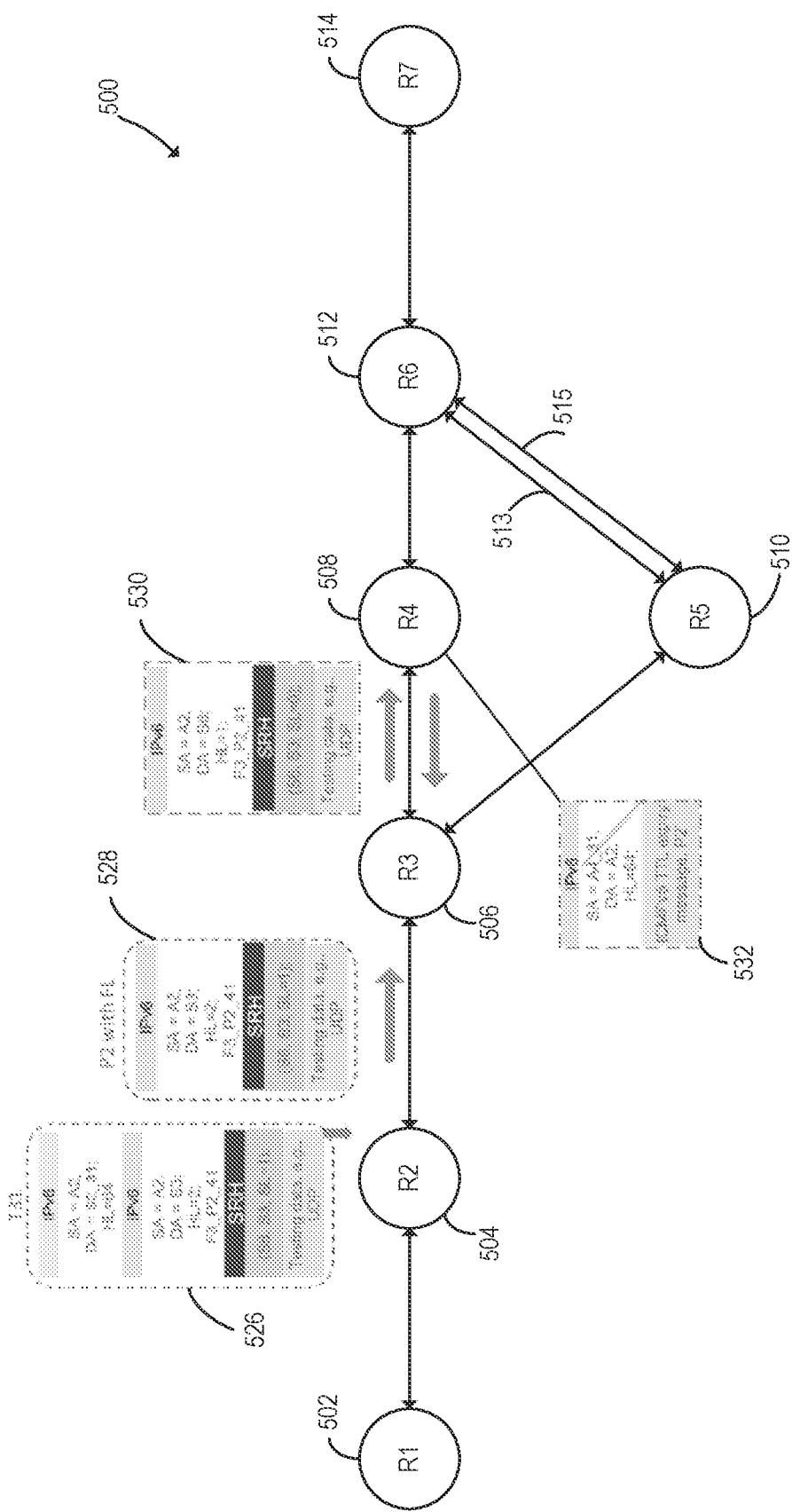

After IP forwarding interface of node 504 removes the outer IPv6 header of data packet 526, node 504 can send data packet 528 shown in FIG. 5D to node 508, which is one of the next hops of node 506. Node 506 can then update DA and HL parameter in IPv6 header of data packet 528 (e.g., set DA to S6, and decrement HL by one to HL=1) and update SL parameter (e.g., change SL parameter to SL=0). This updated data packet is shown as data packet 530, which is forwarded by node 506 to node 508. While not shown in FIG. 5D, node 504 can generate and send similar data packets to data packets 526, 528 and 530 for node 510, which is another one of the next hops of node 506. Testing data packet 526 (T31) for node 508 described above, and similarly a testing data packet T32 for node 510 can be as shown below:

T31: (A2, S2_31) (A2, S3; HL=2; F3_P2_41) (S6, S3; SL=1)

T32: (A2, S2_31) (A2, S3; HL=2; F3_P2_51) (S6, S3; SL=1).

After forwarding data packet 530 to node 508, Node 506 can wait for response data packet 532 from node 508. Data packet 532 can include an IPv6 header with SA (e.g., IPv6 interface IP of node 508), a DA (router ID of node 504) and HL parameter (e.g., HL=64). Data packet 532 can include a reply message (e.g., an ICMPv6 TTL expiry messages that indicates validation of IP forwarding of node 506 to node 508). Data Packet 532 is then sent back to node 504 by node 506. A similar data packet may also be received from node 510 (not shown in FIG. 5D).

Figure 5E:
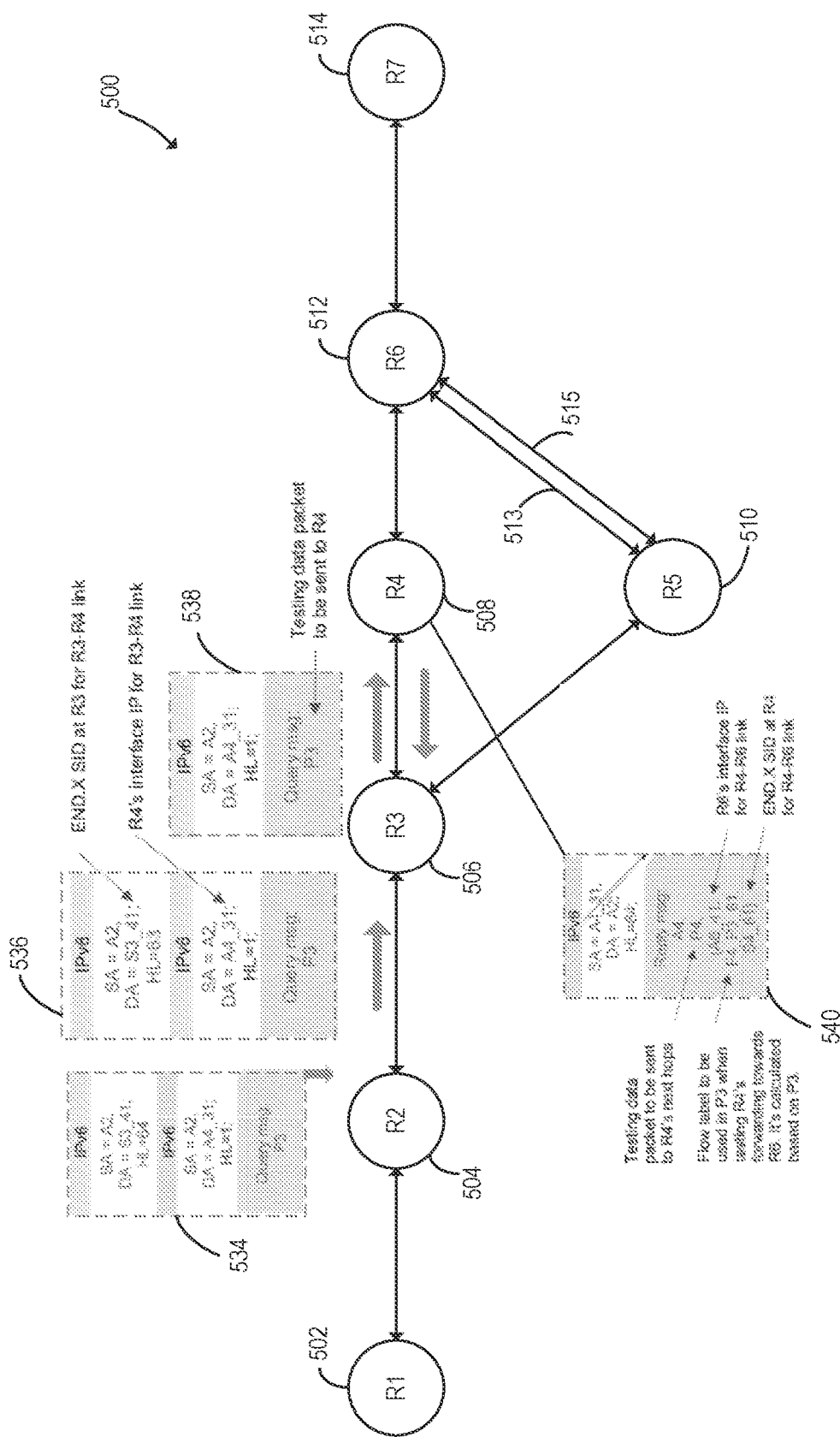
Figure 5F:
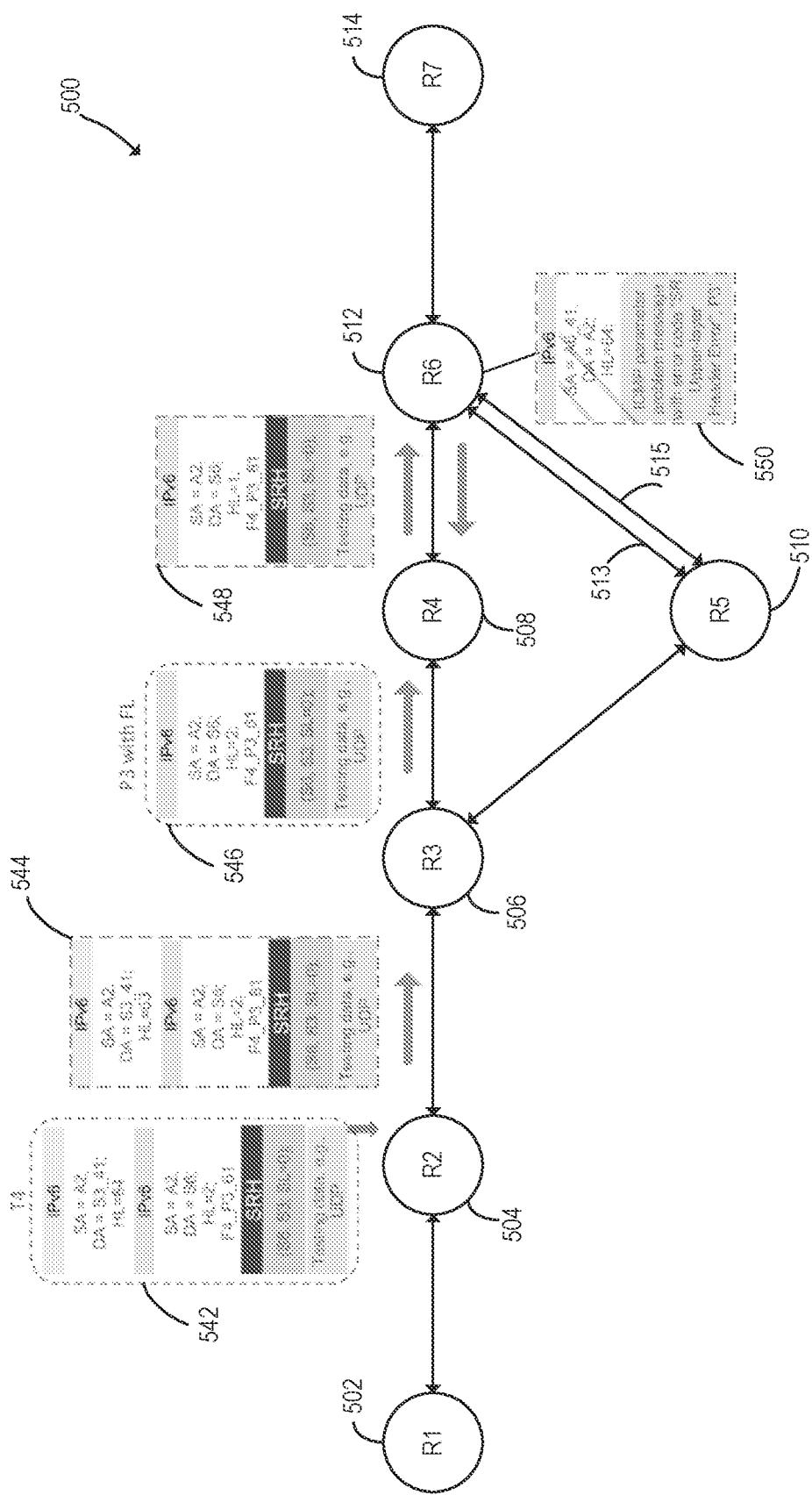

At this stage of the end-to-end validation of multiple paths, node 504 is aware of nodes 506, 508 and 510 and has validates the IP forwarding of node 506 to node 508 (and/or node 510, assuming receipt of corresponding ICMPv6 TTL expiry messages from node 510 in a data packet similar to response data packet 532). Next, node 504 may repeat the above two-step process for nodes 508 and 510 to validate IP forwarding of nodes 508 and 510. FIGS. 5E and 5F describe the two-step process for node 508 (which can be similarly replicated for node 510).

As shown in FIG. 5E, node 504 generates a data packet 534 for querying node 508 for next hops of node 508 (or alternatively receives the query data packet from a network controller (e.g., controller 212 of FIG. 2)). Data packet 534 can include a SA (e.g., router ID of node 504), a DA that can be path information of previous hop of node 508 (e.g., END.X SID of node 506) and other information such as HL parameter (e.g., HL=64) in an outer IPv6 header of data packet 534. Data packet 534 can also include an inner IPv6 header with information including SA (e.g., router ID of node 504), interface IP for a link between nodes 506 and 508, HL parameter (e.g., HL=1), testing data P3 (as described above). Node 504 can forward data packet 534 to node 506 after updating HL parameter in the outer IP header (shown as data packet 536 in FIG. 5E). Upon receipt, node 506 can remove outer IPv6 header of data packet 536 at IP forwarding interface of node 506 before forwarding the same to node 508 (shown as data packet 538 in FIG. 5E).

In response, node 508 can send data packet 540 back to node 506 (to be sent back to node 504). Data packet 540 can include an IPv6 header with SA (e.g., IPv6 interface IP of node 508), a DA (router ID of node 504) and HL parameter (e.g., HL=64). Data packet 540 can also include a reply message that includes testing data P4 for testing IP forwarding of node 508, interface IP of node 512 for link between nodes 508 and 512, a flow label for testing IP forwarding of node 508, and path information (e.g., END-X SID) of node 508.

In one example, using path information (e.g., END.X SID with decapsulation) can provide the following advantages. When node 504 receives a data packet with a reply message from node 508 such as data packet 540 (not an ICMP TTL expiry message from node 508 or any other node) for the query data packet 534 sent from node 504 to node 508, node 504 can confirm that (1) END.X SID S3_41 (of node 506) has forwarded decapsulated packet 538 to node 508 and (2) END.X SID S3_41 (of node 506) has been configured at the immediate upstream node of node 508, because data packet 534 uses HL=1 in inner IPv6 header, as shown in FIG. 5E. Based on (1) and (2), node 504 can confirm that once data packet 536 was decapsulated, the decapsulated data packet 538 was directly sent to node 508 without going through any other node. Thus, when the same END.X SID (with decapsulation) is used for steering the testing data P3 (with corresponding flow label) to node 508 in the testing/validation phase (described below with reference to FIG. 5F), testing data P3 is guaranteed to first reach node 508. If node 508 correctly forwards packets with SID-list <S3, S6>, testing data P3 will reach node 512 (which is the correct next hop of node 508) and node 504 subsequently receives an ICMP TTL expiry message from node 512. Thus, to confirm traversal of testing packets via the node being tested (i.e., node 508), the proposed method eliminates the requirement of an ICMP TTL expiry messages from node 508 being tested, which reduces the number of required testing packets by fifty percent.

As shown in FIG. 5F, node 504 can generate testing data packets such as data packet 542 (T4). In another example, data packet 542 can be provided to node 504 (e.g., by a network controller, e.g. controller 212 of FIG. 2). Testing data packet 542 can be as follows:

T4: (A2, S3_41) (A2, S6; HL=2; F4_P3_61) (S6, S3; SL=0).

Data packet 542 can include an outer IPv6 header that is the same as outer IPv6 header of data packet 534 described above with reference to FIG. 5E. Inner IPv6 header of testing data packet 542 can include SA (e.g., router ID of node 504) and a DA (e.g., SID of node 512), HL parameter (e.g., HL=2), and flow label for node 512 (received by node 504 as part of reply message in data packet 540 described above with reference to FIG. 5E). Data packet 542 can also include an SRH with SID-list and SL parameter (e.g., SL=0), and testing data (e.g., User Datagram Protocol (UDP)).

Node 504 can send testing data packet 542 to node 506 after updating HL parameter in the outer IP header (shown as data packet 544 in FIG. 5F). Upon receipt, node 506 may remove the outer IPv6 header of data packet 544 and transmit as data packet 546 to node 508. Node 508 may then update one or more parameters such as HL (e.g., decrement HL by one to HL=1) and send as data packet 548 to node 512.

In response to receiving data packet 548, node 512 may generate data packet 550 to be sent back to node 504. Data packet 550 can include an IPv6 header with a SA (e.g., IPv6 interface IP of node 512), a DA (e.g., address of node 504) and a message. Since the next hop of node 508 is the destination node (tailend node 512), the message received by node 504 as part of data packet 550 may be an ICMP parameter problem message with error code "SR Upper-layer Header Error" from node 512. Reception of ICMP parameter problem message within data packet 550 can confirm that node 508 correctly forwards packets with SID-list <S3, S6>. The same process as described above for validating packet forwarding of node 508 with reference to FIGS. 5E and 5F, can be implemented to validate packet forwarding of node 510.

Once IP forwarding of node 508 (and/or node 510) is validated, node 504 can perform a similar process to query and validate node 512. In doing so, node 504 can generate a query data packet, with appropriate header information, and send the query data packet to node 512 requesting information on ECMP paths of node 512. Such query data packet can be for example message Q shown below:

Q: (A2, S4_61) (A2, A6_41; HL=1) [P4]

Node 512 can then reply with a data packet including appropriate header information and a message to indicate that node 512 is the destination node in the SID-list <S3, S6>. For example, such reply message can be message M shown below:

M: (A6_51, A2) [A6, is_destination=True]

To ensure the last SID of the SID-list is programmed in IP forwarding of node 512, node 504 can send testing message T, shown below:

T: (A2, S4_61) (A2, S6; HL=1) (S6, S3; SL=0)

Since S6 is the last SID and is a local SID of node 512, node 512 can send node 504 an ICMP parameter problem message with error code "SR Upper-layer Header Error". Reception of this with ICMP parameter problem message confirms that S6 is programmed in IP forwarding of node 512.

Figure 5G:
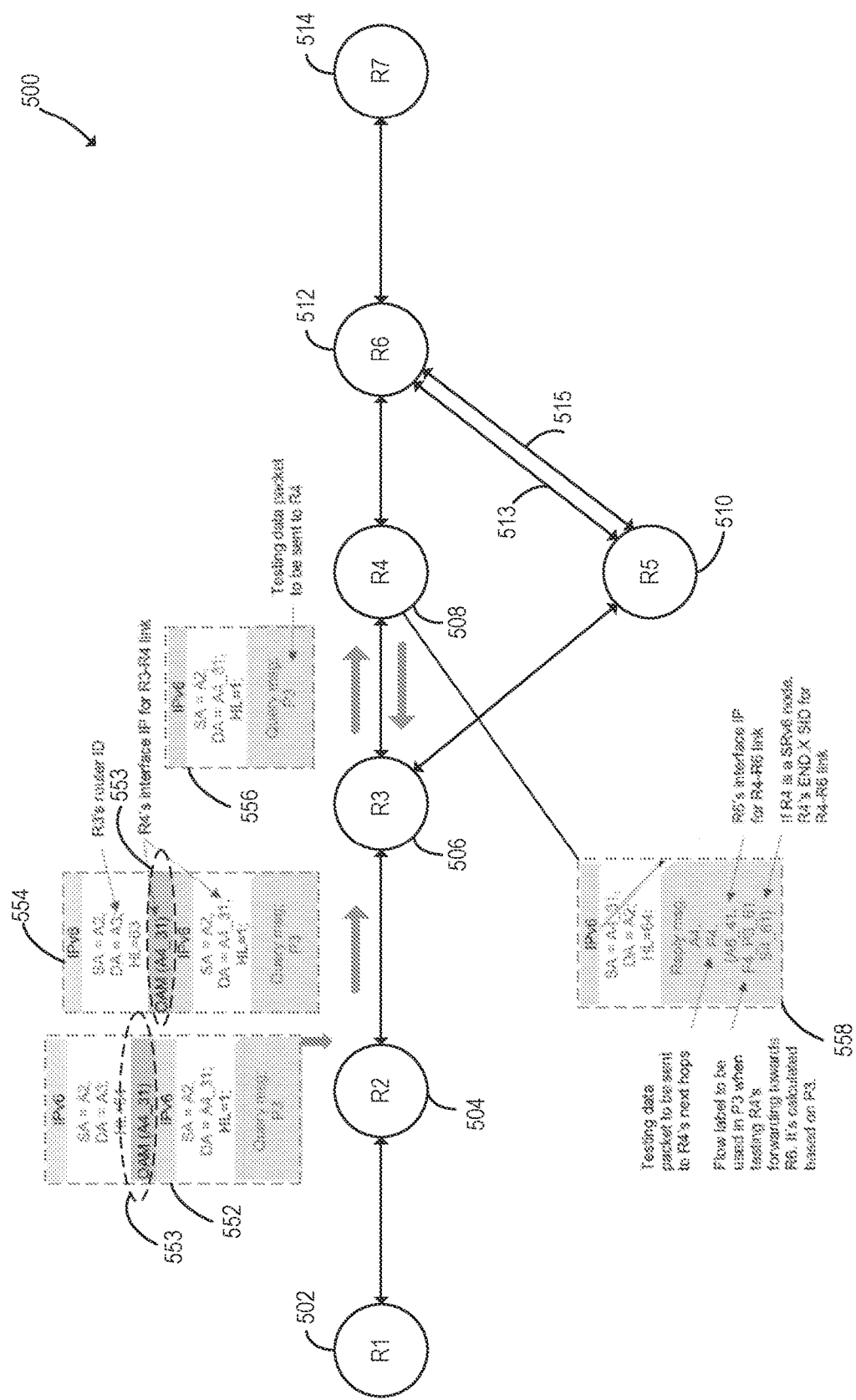
Figure 5H:
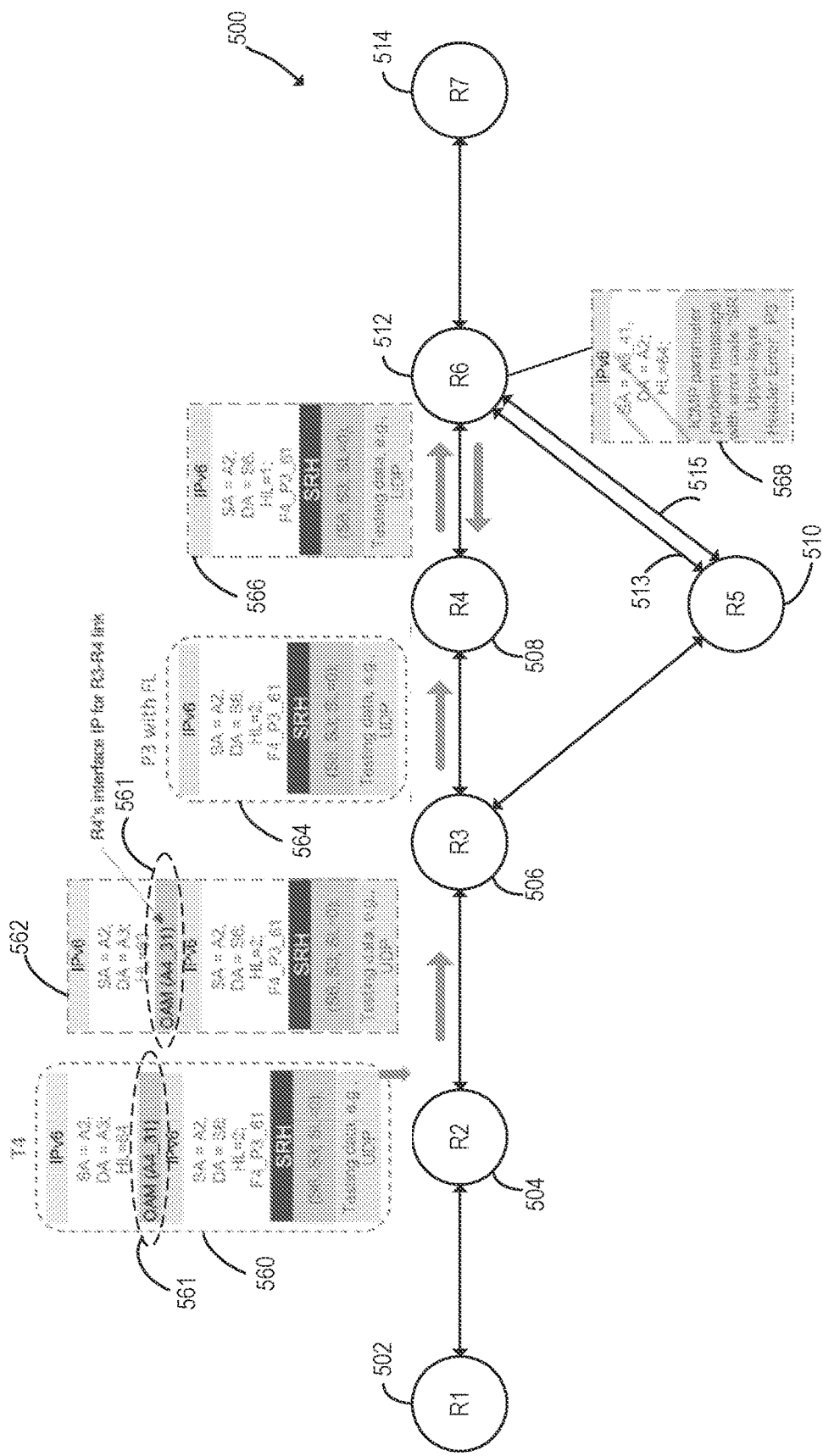

The above examples described with reference to FIGS. 5A-5F are based on the assumption that nodes 506, 508, 510 and/or 512 are SRv6 nodes. FIGS. 5G and 5H describe examples where such nodes may be non-SRv6 nodes.

In a non-SRv6 scenario, path information (e.g., END.X SID may not be available at a previous hop). Therefore, instead of relying on END.X SID as described above with reference to FIGS. 5A-5F, node 504 can construct query and test packets and encapsulate them in an Operations, Administration and Management (OAM) header (e.g., IPv6 UDP) destined to the previous-hop of a hop (node) being queried/validated. The OAM header includes the IPv6 address of the interface at a node connected to corresponding previous node. Previous node can use that interface address to pre-route the encapsulated query and test packets to intended node.

In non-limiting example of FIG. 5G, node 506 is a non-SRv6 node. Query data packet 552 constructed for querying node 508 is encapsulated in OAM header 553 of previous-hop of node 508, which is node 506 (e.g., OAM (A4_31)). Aside from encapsulation of a query message (e.g., the flow label for node 508, SRH, testing data, etc.) in an OAM header 553, the remaining process of querying node 508 may be performed as described above (e.g., sending packet 554 to node 506, which is decapsulated and forwarded to node 508 as data packet 556, followed by reception of reply data packet 558 that can include revised testing data P4, interface IP address of node 512 and END.X SID of node 508 if node 508 is a SRv6 node).

Similarly, FIG. 5H describes a process of validating IP forwarding of node 508 when node 506 is a non-SRv6 node. The process of FIG. 5H is the same as that described above with reference to FIG. 5F except that the testing data packet is encapsulated in OAM header 561. For example, data packet 560 is the same as data packet 542 of FIG. 5F (with the exception of OAM header 561), data packet 562 is the same as data packet 544 of FIG. 5F (with the exception of OAM header 561), data packet 564 is the same as data packet 546 of FIG. 5F, data packet 566 is the same as data packet 548 of FIG. 5F, and data packet 568 is the same as data packet 550 of FIG. 5F. Accordingly, the process of FIG. 5H will not be further described for sake of brevity.

With several non-limiting examples of two-steps processes for validating end-to-end multiple paths including SRv6 and/or non-SRv6 nodes, with reference to FIGS. 5A-5H, an overview of such two-step process is described below with reference to FIG. 6.

Figure 6:
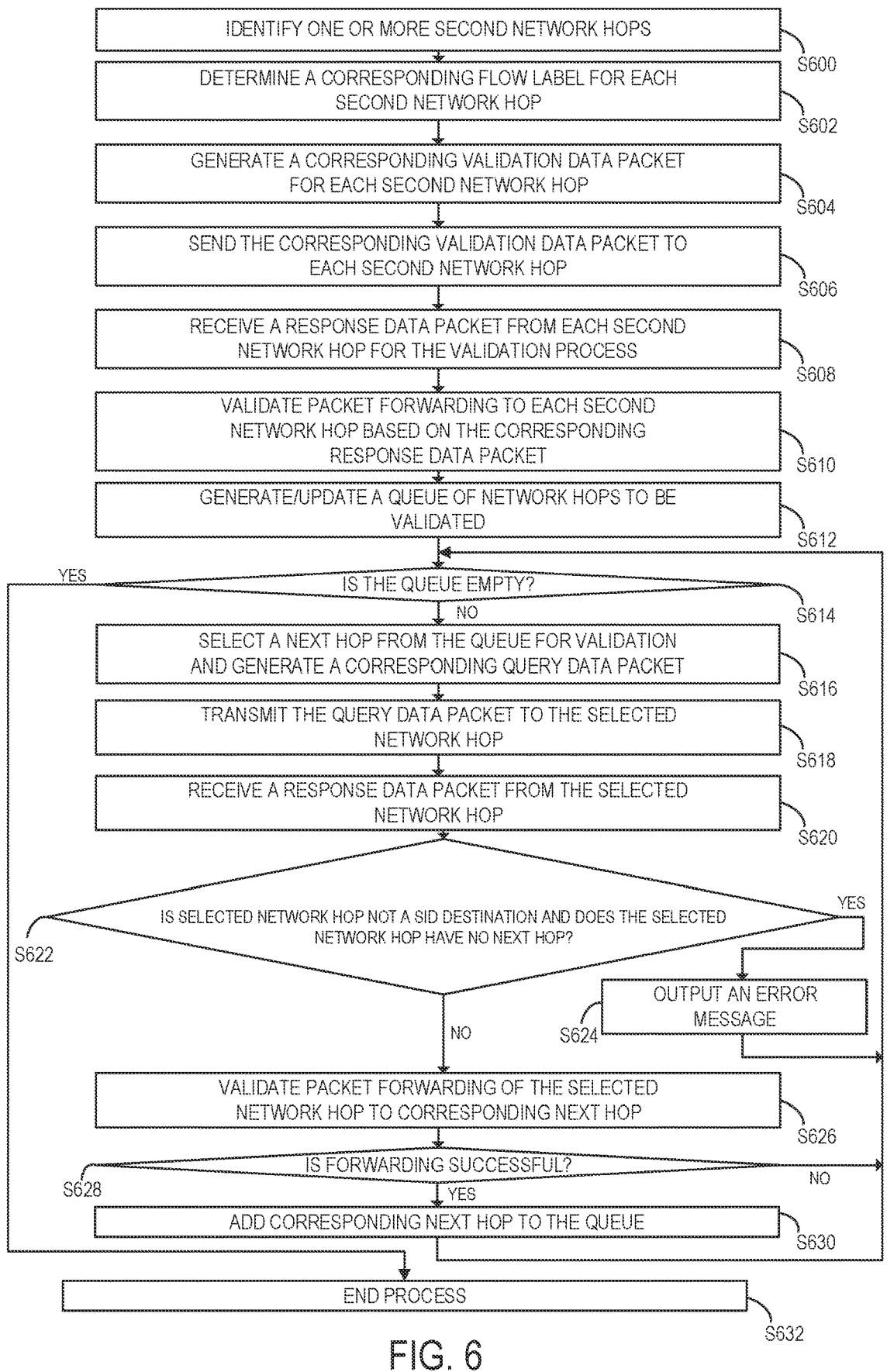
FIG. 6 is a flow chart of a multiple path validation process for segment routing, according to some aspects of the present disclosure.

FIG. 6 is a flow chart of a multiple path validation process for segment routing, according to some aspects of the present disclosure. FIG. 6 is described with reference to node 504. However, it should be understood that node 504 may have one or more memories having computer-readable instructions stored therein and one or more processors configured to execute the computer-readable instructions to perform the steps of FIG. 6. FIG. 6 will also be described with reference to example network structure 500 of FIGS. 5A-5H. However, the validation process is equally applicable to any other network structure with multiple paths (e.g., ECMPs) between a headend node and a tailend node thereof.

Node 504 may have or be configured to route network traffic and corresponding data packets from a source node (e.g., node 502) to a destination node (e.g., node 514). In order to do so, node 504 performs a process to validate all possible multiple paths (e.g., ECMPs), which in examples of FIGS. 5A-5H are formed of nodes 504, 506, 508, 510 and 512.

At S600, node 504 (first network hop) can identify one or more second network hops. The one or more second network hops include nodes that are adjacent to (directly connected to) node 504 on a downstream direction toward a destination node (e.g., node 514). In examples of FIGS. 5A-5H, node 504 has one second network hop, which is node 506. In one example node 504 identifies the one or more second network hops by querying an IP forwarding for a given SID-list (e.g., SID-list <S3,S6> described above). The process at S600 is described above with reference to FIG. 5A.

At S602, node 504 can determine, for each second network hop identified at S600 (e.g., node 506), a corresponding flow label. For example, node 504 can determine a flow label for node 506 using example process described above with reference to FIG. 5A. A flow label can be included in a test packet for validating packet forwarding of node 504 for forwarding data packets to node 506.

Next, node 504 may perform a validation process to validate packet forwarding of node 504 to each of the second network hop identified at S600 (e.g., node 506) using the corresponding flow label and the corresponding path instructions for that particular second network hop. This validation process may be performed through steps S604, S606, S608 and S610. This validation process can be performed, as described above with reference to FIG. 5B.

More specifically, at S604, node 504 may generate a data packet (a validation data packet) for each second network hop for validating the packet forwarding of node 504. Such validation data packet can be generated based on the corresponding flow label for each second network hop (e.g., flow label for node 506), as described above with reference to FIG. 5B (e.g., data packet 516).

At S606, node 504 can send a corresponding validation data packet generated for each second network hop to the corresponding second network hop. For example, node 504 can send a validation data packet determined at S604 for node 506, to node 506.

At S608, node 504 may receive a response data packet after sending a corresponding validation data packet to the corresponding one of the one or more second network hops. For example, node 506 can generate a response data packet upon receiving the validation data packet sent thereto by node 504 at S606.

At S610, node 504 can validate packet forwarding of node 504 to each second network hop from which a corresponding response data packet is received at S608 is validated. For example, if the response data packet received from node 506 includes a confirmation message (e.g., an ICMPv6 TTL expiry message), then node 504 determines that packet forwarding of node 504 to node 506 has been successful. Otherwise, node 504 can generate and output an error message (e.g., "Packet forwarding to this next-hop failed.").

At S612, node 504 can generate a queue of network hops (a queue of network nodes) based on a validation result (successful packet forwarding or failure of packet forwarding) of performing the validation process. A queue can include any one of the one or more second network hops that node 504 has successfully forwarded packets to, as determined at S610. In example of FIG. 5B, node 504 validates its packet forwarding to node 506 and thus node 506 is included in the queue. If there are more than one second network hop to which packet forwarding of node 504 is validated, then such nodes can be included in the queue as well. Depending on outcome of the remaining steps of FIG. 6 described below, the queue may be updated to include additional network hops.

The remaining steps of FIG. 6 described below, are directed to performing a two-step process to (1) query each hop in the queue to obtain information of corresponding subsequent hops (e.g., adjacent hops) of that node and (2) validate packet forwarding of each hop in the queue. Examples of this two-step process are described above with reference to FIGS. 5C-5F.

At S614, node 504 can determine whether the queue is empty. If the queue is empty, the process proceeds to S632, where the process ends. If the queue is not empty, the process proceeds to S616 and node 504 can iteratively perform processes of steps S616 to S630 to validate packet forwarding for each node in the queue.

At S616, node 504 can select a next hop from the queue and generate a query data packet to be sent to the selected hop to obtain information on next hop(s) (adjacent hop(s)) of the selected hop in the queue. In one example, network hops in the queue may have an assigned order and each time node 504 performs S616, node 504 selects a "first in line" of the network hops in the queue for generation of a corresponding query data packet.

For example, node 504 can generate a query data packet for node 506 in order to obtain identification of next hop(s) of node 506 (e.g., nodes 508 and 510). In one example, node 504 may generate the query data packet as described above with reference to FIG. 5C (e.g., data packet 520 of FIG. 5C). In some cases, node 506 may not be a SRv6 nodes and thus may not have corresponding END.X SID with decapsulation. As described above, OAM headers may be used instead for the validation of packet forwarding of node 506.

At S618, node 504 can transmit the query data packet to the selected next hop (e.g., node 506).

At S620, node 504 can receive a response data packet from the selected next hop to which the query data packet is transmitted at S618.

At S622, node 504 can determine, based on the response data packet received at S620, whether the selected next hop is a destination of a SID-list included in the query data packet sent to the selected next hop at S616 and whether the selected next hop has a corresponding next hop. A response data packet can indicate that the selected next hop is a destination of SID-list (e.g., when the corresponding next hop is node 512 in example of FIGS. 5A-5H). This may be indicated via, for example, "is_destination=True" message. Node 504 can further determine if the selected network hop has a corresponding next hop (e.g., node 508 and/or node 510 relative to node 506). In one example, node 504 can determine if the selected network hop has a corresponding next hop or not, if the response data packet received at S620 does not include an identification (e.g. router ID or an interface IP of a corresponding next hop).

If at S622, node 504 determines that the selected network hop (e.g., node 506) is not the destination of the SID-list and the selected network hop does not have a corresponding next hop (or determines that the selected network hop is the destination of the SID-list and the selected network hop has a corresponding next hop), then at S624, node 504 can output an error message (e.g., "Destination cannot be reached via this ECMP path"). Thereafter, the process reverts back to S614, where node 504 can select a next hop in the queue to be queried (per S614-S624), if the queue is not empty, or can end the process if the queue is empty.

However, if at S622, node 504 determines that the selected network hop is the destination of the SID-list or the selected next hop has corresponding next hop(s), then at S626, node 504 can perform a validation process to validate packet forwarding of the selected network hop to each of the corresponding next hop(s) of the selected network hop. For example, node 504 can perform a validation process to determine whether node 506 can forward data packets to node 508 and/or node 510. This validation process can be perform in the same manner as described above with reference to FIGS. 5D and 5E and can be similarly repeated for node 510 as well (e.g., by generating and sending query data packet such as data packet 526 and receiving reply data packet 540).

At S628, node 504 can determine whether packet forwarding of the selected node to a corresponding next hop of the selected node is successful or not. As noted above, if a reply data packet received from a corresponding next hop of the selected node includes an "ICMPv6 TTL expiry message," then node 504 can determine that packet forwarding of the selected node to its corresponding next hop is successful (e.g., in FIG. 5D, reply data packet 532 includes an "ICMPv6 TTL expiry message.").

If such message is not included in the reply data packet, then at S628, node 504 determines that packet forwarding is not successful and may output an error message (e.g., "Packet forwarding to this next hop failed."). Otherwise, when the packet forwarding of the selected node to its corresponding next hop is successful, at S630, node 504 adds the corresponding next hop of the selected node to the queue. Thereafter, the process reverts back to S614 and node 504 may iteratively repeat S614 to S630 until the queue is empty. One example iteration of this process (e.g., for a corresponding next hop (e.g., node 512) of a selected network hop (e.g., node 508) is described above with reference to FIGS. 5E and 5G.

A non-limiting example of a set of computer-readable instructions for performing the process of FIG. 6 is provided below.

---

Algorithm 1: Algorithm executed at the headend

```
Input: SID-list=<S1, S2,...,Sn>, headend
Output: "Success" when all nodes in all ECMP paths forward packets correctly; or "Failed" and a list of
nodes failed to forward packets correctly
typedef struct {
    in6_addr_t ip; /* interface ip (initially) or router id (later) */
    uint32_t flow_label; /* used for testing upstream node */
    in6_addr_t end_x_sid; /* used for testing this node */
    ipv6_packet test_packet; /* used for testing this node */
} node_t;
typedef struct {
    in6_addr_t router_id;
    bool is_destination;
    /* next hops programmed for the appropriate SID of the SID-list */
    uint8_t num_next_hops;
    node_t *next_hops;
} query_node_t; /* stores info in the node being queried */
/* NOTE: test_packet for all the next hops of a node is the same. It has been added to node_t, instead of
query_node_t, to simplify the illustration of the algorithm. */
nodes_to_query_and_test = [ ];
failed_next_hops = [ ];
query_node_t query_node;
ipv6_packet P1;
/* Let H_RID denote the router ID of headend */
Initialize P1 such that P1: (H_RID, S1; HL=2)(Sn,...,S2,S1; SL=n-1).
/* Query headend and find info on ECMP paths */
Headend queries itself and finds next hops for P1.
For each next hop, it finds an END.X SID with decapsulation.
For each next hop, headend calculates a flow label based on P1 s.t. with this flow label, P1 is forwarded to
the next hop.
Headend fills query_node structure with next hops. END.X SID's, and flow labels, test_packet of each
node_t structure in query_node.next_hops is initaized to P1. Then, test_packets' DA and SRH are updated
if S1 is local SID of headend.
/* NOTE:updated test_packet in node_t is used for testing packet forwarding of the node which corresponds
to the node_t */
/* Test headend's forwarding */
for all node in query_node.next_hops:
    Headend crafts a testing data packet T which is P1 with node.flow_label.
    /* T:(H_RID, S1; HL=2; node.flow_label)(Sn,...,S2,S1; SL=n-1) */
    Headend submits T its IP forwarding.
    if received an ICMPv6 TTL expiry message with SA=node.ip:
        /* Forwarding to this next hop validated */
        nodes_to_query_and_test.add(node) /* enqueue at tail */
    else:
        /* Forwarding to this next hop failed */
        failed_next_hops.add((headend, node))
/* Query and test transit and destination nodes */
node = nodes_to_query_and_test.get_first( )
while node is not NULL:
    Send query message Q and waits for a reply, where
    Q:(H_RID, node.end_x_sid)(H_RID, node.ip; HL=1)[node.test_packet].
```

-continued

| Algorithm 1: Algorithm executed at the headend |
|---|

When END.X SID is not available, use OAM control plane method to send the query message.
Headend receives reply M, and it fills a new query_node_t structure called query_node with data from payload of M.
if there is node-t in nodes_to_query_and_test s.t. node-t.ip == query_node.router_id:
    /* This node has already been queried and tested */
    node = nodes_to_query_and_test.get_next( )
    Continue:
Set node.ip = query_node.router_id
if (query_node.is_destination is False) and (query_node.next_hops is empty):
    /* Error: Destination is not reachable via this ECMP path */
    failed_next_hops.add((node))
    node = nodes_to_query_and_test.get_next( )
    Continue:
/* Validate destination node's forwarding */
if query_node.is_destination is True:
    Create a testing data packet P by copying node.test_packet, and setting HL=1.
    Headend sends data packet T which is created by encapsulating P with an outer IPv6
    header, where
        T:(H_RID, node.end_x_sid)(P).
        When END.X SID is not available, use OAM control plane method to send test packet.
        if received an ICMP parameter problem message with error code "SR Upper-layer Header
        Error" and SA=node.ip:
            /* Validated this node's forwarding */
            /* Note: info on ICMP parameter problem message with error code "SR Upper-
            layer Header Error" is in section 4.3.1 of SRH draft */
        else:
            /* Forwarding at this node failed */
            failed_next_hops.add((node))
        node = nodes_to_query_and_test.get_next( )
        Continue:
    /* Validate node's ability to forward packets to each next hop (this is a transit node) */
    for all node-nh in query_node.next_hops:
        Create a testing data packet P by copying node.test_packet and setting its flow label to be
        node-nh.flow_label.
        /* HL=2 in P */
        Headend sends data packet T which is created by encapsulating P with an outer IPv6
        header, where
        T:(H_RID, node.end_x_sid)(P).
        When END.X SID is not available, use OAM control plane method to send test packet.
        if received (ICMP parameter problem message with error code "SR Upper-layer Header
        Error" and SA=node-nh.ip) or (ICMPv6 TTL expiry message with SA=node-nh.ip):
            /* Forwarding to this next hop validated */
            nodes_to_query_and_test.add(node-nh) /*enqueue at tail*/
        else:
            /* Forwarding to this next hop failed */
            failed_next_hops.add((node, node-nh))
    node = nodes_to_query_and_test.get_next( )
/* end of while loop */
if failed_next_hops empty:
    return "Success"
else:
    return "Failed" and failed_next_hops

| Algorithm 2: Algorithm executed at all nodes except headend |
|---|

Input: Query message Q' received by node node
Output: Reply to the query message
/* When headend send query message Q.
Q:(H_RID, node.end_x_sid)(H_RID, node.ip: HL=1)[node.test_packet],
node which has an interface ip of node.ip receives Q',
Q':(H_RID, node.ip; HL=1)[node.test_packet].
This is due to immediate upstream node of node strips outer IPv6 header with END.X (with decapsulation) SID. */
if (DA of node.test_packet is a SID of node) and (node.test_packet does not have an SRH or last SID of SRH is DA):
  /* node is the destination node */
  node fills a query_node_t structure with its router id and is_destination=True.
else:
  if DA of node.test_packet is a SID of node:
    node updates DA and SRH of node.test_packet, as it would normally process
    node.test_packet in forwarding.
  node finds next hops for DA of (updated) node.test_packet.

| Algorithm 2: Algorithm executed at all nodes except headend |
| --- |
| If node is a SRv6 node, for each next hop, node finds an END.X SID with decapsulation.<br>For each next hop, node calculates a flow label based on the (updated) node.test_packet s.t. with this flow label, (updated) node.test_packet is forwarded to the next hop.<br>node fills a query_node_t structure with its router id, next hops' IP's, flow labels, END.X SID's with decapsulation (if available), and (updated) node.test_packet.<br>node sends reply M to the headend, where<br>M:(node.ip, H_RID)[data in query_node_t structure] |

Examples of validating end-to-end multiple paths for SRv6 data plane described above can provide the following advantages compared to available methods described above. For example, the validation process of the present disclosure is computationally efficient by having each network hop determine one flow label per next hop (e.g., an egress interface of next hop) and eliminate the need to determine a flow label that is common among flow label sets corresponding to network hops on an end-to-end ECMP. A further example advantage is the ability to test all end-to-end ECMPs including end-to-end ECMPs that may be traversed by data packets when the data packets' destination IP, next header or flow label is changed by an intermediate node and end-to-end ECMPs due to static routes. Other example advantages include validation of end-to-end ECMPs when some network hops on a path are non-SRv6 nodes, validation of the hardware forwarding path, testing of each physical member of a bundle/port channel, and the need for local routing information of a network hop (therefore, inter-Autonomous System (AS) paths may be queried and verified). Further example advantages include actual testing data packets (validation data packets) being a part of the query data packets, and the flow labels being calculated based on the actual testing data packets, with the testing data packets being any type of message such as UDP, Transmission Control Protocol (TCP), Internet Control Message Protocol (ICMP) and any other type of known or to be developed testing data packets. Another advantage of the validation process described herein is that the last SID can be of any type including END, END.X and VPN SID. For example, when the tailend node (e.g., node 512 of FIG. 5) is being validated, tailend node can send to headend node (e.g., node 504) an ICMP parameter problem message with error code "SR Upper-layer Header Error" as the upper layer header of testing data packet is neither IPv4 nor IPv6 (instead such upper layer header can be one of UDP, TCP or ICMP). Finally, the validation process described herein allows for validation of partial SID-lists.

Figure 7:
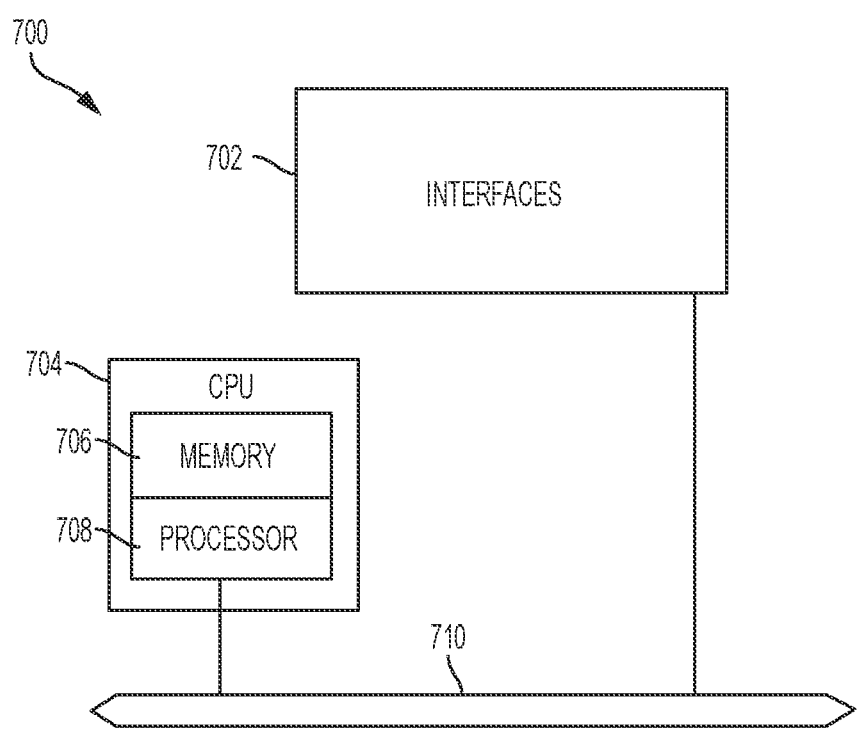
FIG. 7 illustrates an example network device, according to some aspects of the present disclosure.
Figure 8:
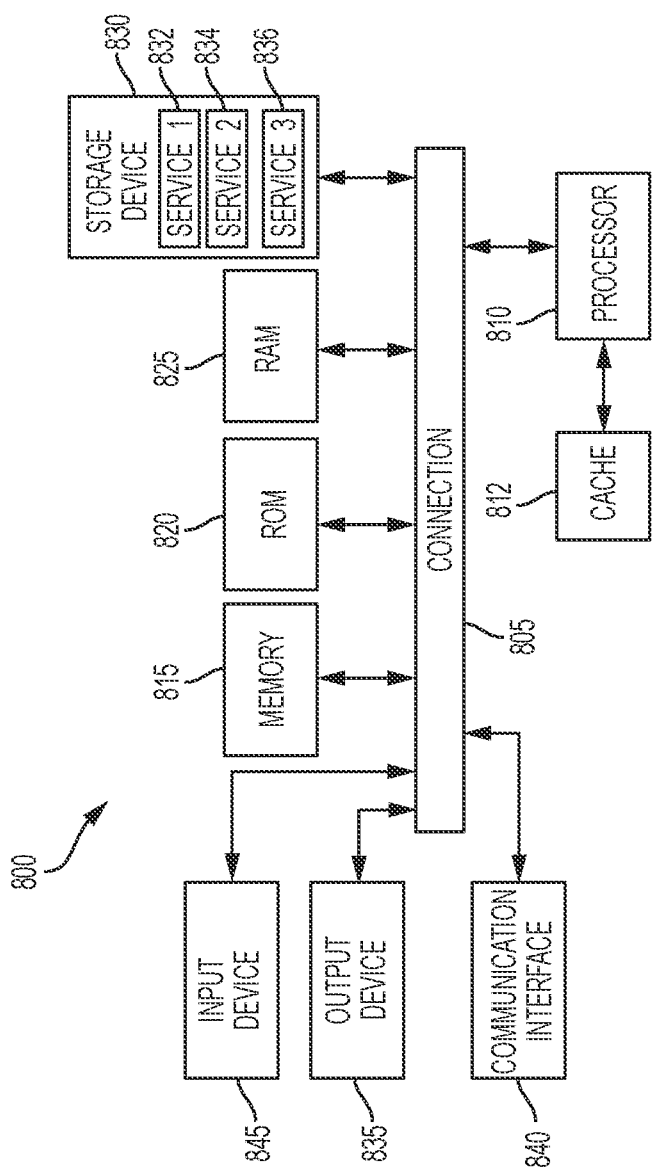
FIG. 8 illustrates an example computing device, according to some aspects of the present disclosure.

With various examples of validating end-to-end multiple paths for SRv6 data plane with reference to FIGS. 5A-H and FIG. 6, the disclosure now turns to FIGS. 7 and 8, which illustrate example network devices and computing devices, such as switches, routers, load balancers, client devices, and so forth. Such example network and computing devices may be used to implement various components described above with reference to FIGS. 1-6 including, but not limited to, network controller 212, any one of nodes 502, 504, 506, 508, 510, 512 and/or 514, etc.

FIG. 7 illustrates an example network device, according to some aspects of the present disclosure. Network device 700 can be suitable for performing switching, routing, load balancing, and other networking operations. Network device 700 includes a central processing unit (CPU) 704, interfaces 702, and a connection 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the connection 710, to exchange data and signals and coordinate various types of operations by the network device 700, such as routing, switching, and/or data storage operations, for example.

FIG. 8 illustrates a computing system architecture, according to some aspects of the present disclosure. Architecture 800 can have components that are in electrical communication with each other using a connection 805, such as a bus. Exemplary system 800 includes a processing unit (CPU or processor) 810 and a system connection 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include services 832, 834, 836 for controlling the processor 810. Other hardware or software modules are contemplated. The storage device 830 can be connected to the system connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method of validating packet forwarding in a multi-cloud environment, the method comprising:
   identifying, by a first network hop, one or more network hops across a multi-cloud environment, wherein the one or more network hops are adjacent or connected to the first network hop;
   determining a corresponding flow label for each of the respective one or more network hops, the corresponding flow label at least identifying data being transmitted from the first network hop to a corresponding hop of the one or more network hops and being separate from a segment identifier;
   validating packet forwarding of the one or more network hops using at least the corresponding flow label;
   determining one or more additional network hops across the multi-cloud environment to be validated based on the validation of the one or more network hops; and
   validating packet forwarding for the one or more additional network hops in the queue.

2. The method of claim 1, wherein clouds of the multi-cloud environment are connected through an overlay network.

3. The method of claim 1, wherein the validating comprises:
   generating a validation test packet for the one or more network hops, the validation test packet including the corresponding flow label and a segment routing header identifying a Segment Identifier list (SID-list);
   sending the validation test packet;
   receiving a response test packet from the one or more network hops; and
   determining the result of the validation process.

4. The method of claim 3, wherein the validation process is one of (1) successful packet forwarding to the one or more network hops when the response data packet includes a confirmation message, or (2) failure of packet forwarding to the co one or more network hops when the message does not include the confirmation message.

5. The method of claim 3, wherein determining the one or more additional network hops includes adding the one or more network hops to the one or more additional network hops if the result of the validation process is the successful packet forwarding to the one or more network hops.

6. The method of claim 1, wherein the validating the packet forwarding for the one or more additional network hops further comprising:
   selecting one of the one of more additional network hops;
   generating a query data packet for the selected network hop;
   receiving a response data packet in response to sending the query data packet from the selected network hop; and
   validating packet forwarding of the selected network hop based on the response data packet.

7. The method of claim 6, wherein the query data packet includes a path instruction of a previous network hop of the selected network hop; and
   the response data packet includes a path instruction of the selected network hop, an identifier of one or more next hops of the selected network hop and a corresponding flow label for each of the one or more next hops of the selected network hop.

8. The method of claim 7, wherein validating the packet forwarding of the selected network hop comprises:
   generating a validation data packet for validating packet forwarding to the selected network hop;
   sending the validation data packet through the selected network hop;
   receiving the response data packet from a next hop of the selected network hop; and
   validating the packet forwarding of the selected network hop based on the response data packet.

9. The method of claim 1, wherein each of the one or more next hops is one of a router or a switch for routing data plane traffic of an IPv6 network using segment routing.

10. A system of validating packet forwarding in a multi-cloud environment, the system comprising:
    at least one processor; and
    at least one memory storing instructions, which when executed by the at least one processor, causes the at least one processor to:
    identify, at a first network hop, one or more network hops across a multi-cloud environment, wherein the one or more network hops are adjacent or connected to the first network hop;
    determine a corresponding flow label for each of the respective one or more network hops, the corresponding flow label at least identifying data being transmitted from the first network hop to a corresponding hop of the one or more network hops and being separate from a segment identifier;
    validate packet forwarding of the one or more network hops using at least the corresponding flow label;
    determine one or more additional network hops across the multi-cloud environment to be validated based on the validation of the one or more network hops; and
    validate packet forwarding for the one or more additional network hops in the queue.

11. The system of claim 1, wherein clouds of the multi-cloud environment are connected through an overlay network.

12. The system of claim 1, further comprising instructions, which when executed by the at least one processor, causes the at least one processor to:
    generate a validation test packet for the one or more network hops, the validation test packet including the corresponding flow label and a segment routing header identifying a Segment Identifier list (SID-list);
    send the validation test packet;
    receive a response test packet from the one or more network hops; and
    determine the result of the validation process.

13. The system of claim 12, wherein the validation process is one of (1) successful packet forwarding to the one or more network hops when the response data packet includes a confirmation message, or (2) failure of packet forwarding to the co one or more network hops when the message does not include the confirmation message.

14. The system of claim 12, wherein determining the one or more additional network hops includes adding the one or more network hops to the one or more additional network hops if the result of the validation process is the successful packet forwarding to the one or more network hops.

15. The system of claim 10, which when executed by the at least one processor, causes the at least one processor to:
    select one of the one of more additional network hops;
    generate a query data packet for the selected network hop;
    receive a response data packet in response to sending the query data packet from the selected network hop; and validate packet forwarding of the selected network hop based on the response data packet.

16. The system of claim 15, wherein the query data packet includes a path instruction of a previous network hop of the selected network hop; and the response data packet includes a path instruction of the selected network hop, an identifier of one or more next hops of the selected network hop and a corresponding flow label for each of the one or more next hops of the selected network hop.

17. The system of claim 16, wherein validating the packet forwarding of the selected network hop comprises:

generating a validation data packet for validating packet forwarding to the selected network hop;

sending the validation data packet through the selected network hop;

receiving the response data packet from a next hop of the selected network hop; and validating the packet forwarding of the selected network hop based on the response data packet.

18. The system of claim 10, wherein each of the one or more next hops is one of a router or a switch for routing data plane traffic of an IPv6 network using segment routing.

19. At least one non-transitory computer-readable medium storing instructions, which when executed by at least one processor, causes the at least one processor to:

identify, at a first network hop, one or more network hops across a multi-cloud environment, wherein the one or more network hops are adjacent or connected to the first network hop;

determine a corresponding flow label for each of the respective one or more network hops, the corresponding flow label at least identifying data being transmitted from the first network hop to a corresponding hop of the one or more network hops and being separate from a segment identifier;

validate packet forwarding of the one or more network hops using at least the corresponding flow label;

determine one or more additional network hops across the multi-cloud environment to be validated based on the validation of the one or more network hops; and validate packet forwarding for the one or more additional network hops in the queue.

20. The at least one non-transitory computer-readable medium of claim 19, wherein clouds of the multi-cloud environment are connected through an overlay network.

\* \* \* \* \*